US011884456B2

(12) United States Patent
Whitmire et al.

(10) Patent No.: US 11,884,456 B2
(45) Date of Patent: Jan. 30, 2024

(54) TOOL STORAGE SYSTEM

(71) Applicant: TECHTRONIC CORDLESS GP, Anderson, SC (US)

(72) Inventors: J. Porter Whitmire, Greenville, SC (US); J. Luke Jenkins, Williamston, SC (US); Stephen A. Hughett, Anderson, SC (US); Brianna E. Williams, Greenville, SC (US); Tyler H. Knight, Greenville, SC (US); Jeffrey Groves, Greenville, SC (US); Austin Clark, Seneca, SC (US)

(73) Assignee: Techtronic Cordless GP, Anderson, SC (US)

( * ) Notice: Subject to any disclaimer, the term of this patent is extended or adjusted under 35 U.S.C. 154(b) by 17 days.

(21) Appl. No.: 17/483,534

(22) Filed: Sep. 23, 2021

(65) Prior Publication Data

US 2022/0097926 A1 Mar. 31, 2022

Related U.S. Application Data

(60) Provisional application No. 63/083,551, filed on Sep. 25, 2020.

(51) Int. Cl.
*B65D 43/16* (2006.01)
*B25H 3/02* (2006.01)
(Continued)

(52) U.S. Cl.
CPC ............... *B65D 43/16* (2013.01); *B25H 3/02* (2013.01); *B25H 3/021* (2013.01); *B65D 21/0209* (2013.01); *B65D 43/22* (2013.01)

(58) Field of Classification Search
CPC .......... B65D 21/0223; B65D 21/0209; B65D 43/22; B25H 3/02; B25H 3/021
(Continued)

(56) References Cited

U.S. PATENT DOCUMENTS 2,183,428 A 12/1939 Mcnary
2,541,828 A 2/1951 Peck
(Continued)

FOREIGN PATENT DOCUMENTS

AU 2015101015 B4 9/2015
CA 2255182 C 7/2003
(Continued)

OTHER PUBLICATIONS

Partial European Search Report for Application No. 21199012.2 dated Feb. 21, 2022 (12 pages).
(Continued)

*Primary Examiner* — Rafael A Ortiz
*Assistant Examiner* — Sanjidul Islam
(74) *Attorney, Agent, or Firm* — Dority & Manning, P.A.

(57) ABSTRACT

A storage container system includes rolling toolbox, a storage container, a storage bin, and a storage container assembly. Various aspects relate to a storage container including at least one sidewall extending from a base, the sidewall at least partially defining an outer wall of an interior compartment. A lid is coupled to the sidewall and movable between an open position and a closed position. The interior compartment is accessible while the lid is in the open position, and the interior compartment is covered while the lid is in the closed position.

19 Claims, 33 Drawing Sheets

(51) Int. Cl.
*B65D 43/22* (2006.01)
*B65D 21/02* (2006.01)

(58) Field of Classification Search
USPC ................ 206/503, 349, 1.5, 482, 508–509; 220/342
See application file for complete search history.

(56) References Cited

U.S. PATENT DOCUMENTS 2,695,105 A 11/1954 Mitchell
2,784,840 A 3/1957 John
3,327,896 A 6/1967 Asenbauer
3,371,975 A 3/1968 Meltzer
3,504,405 A 4/1970 Elliott-Smith
3,578,153 A 5/1971 Olson
3,581,906 A 6/1971 Joyce
3,749,233 A 7/1973 McCormick
4,119,285 A 10/1978 Bisping et al.
4,150,746 A 4/1979 Buglione
4,577,773 A 3/1986 Bitel
4,659,154 A 4/1987 Jenkins
4,776,481 A 10/1988 Kidd
4,790,549 A 12/1988 Armand
4,844,279 A 7/1989 Chalat
4,896,897 A 1/1990 Wilhelm
4,953,764 A 9/1990 Kovacs
5,011,013 A 4/1991 Meisner et al.
5,148,942 A 9/1992 Snook
5,152,441 A 10/1992 Torena
5,295,742 A 3/1994 Knutson
5,335,789 A 8/1994 Taravella et al.
5,344,024 A 9/1994 Cohu
5,359,752 A 11/1994 Domenig
5,386,907 A 2/1995 Kahl et al.
5,503,277 A 4/1996 O'Brien
5,518,139 A 5/1996 Trower et al.
5,549,241 A 8/1996 Correll
5,564,805 A 10/1996 Dickinson
5,575,401 A 11/1996 Trower et al.
5,601,196 A 2/1997 Heer et al.
5,603,559 A 2/1997 Yemini
5,660,276 A 8/1997 Winnard
5,669,515 A 9/1997 Tisbo et al.
5,680,932 A 10/1997 Dickinson et al.
5,709,008 A 1/1998 Dickinson
5,725,096 A 3/1998 Winnard
5,752,602 A 5/1998 Ackermann et al.
5,762,411 A 6/1998 Yemini
5,799,915 A 9/1998 Morey
5,803,254 A 9/1998 Vasudeva
5,826,718 A 10/1998 Ahern, Jr. et al.
5,882,097 A 3/1999 Kohagen et al.
5,887,715 A 3/1999 Vasudeva
D407,559 S 4/1999 Roegner
5,890,571 A 4/1999 Sadow
5,915,554 A 6/1999 Hung
5,927,450 A 7/1999 Sadow
5,957,321 A 9/1999 Jones
5,960,708 A 10/1999 Detemple et al.
6,047,824 A 4/2000 Winnard
6,073,766 A 6/2000 Winnard
6,105,767 A 8/2000 Vasudeva
6,123,344 A 9/2000 Clegg
6,129,229 A 10/2000 Dunn et al.
6,170,839 B1 1/2001 Kizewski
6,176,499 B1 1/2001 Conrado et al.
6,176,559 B1 1/2001 Tiramani et al.
6,202,865 B1 3/2001 Kuo
6,213,296 B1 4/2001 Streich et al.
6,216,872 B1 4/2001 Haasbroek
6,244,064 B1 6/2001 Powell et al.
6,254,112 B1 7/2001 Clegg
6,260,700 B1 7/2001 Huang
6,311,991 B1 11/2001 Conrado et al.
6,315,149 B1 11/2001 Conrado et al.
6,328,179 B1 12/2001 Conrado et al.
6,343,708 B1 2/2002 Riso
6,347,847 B1 2/2002 Tiramani et al.
6,382,458 B2 5/2002 Mori
6,405,864 B1 6/2002 Streich et al.
6,415,924 B1 7/2002 Lee
6,499,608 B1 12/2002 Sterling et al.
6,520,514 B2 2/2003 Clegg
6,564,949 B1 5/2003 Saathoff
6,571,998 B2 6/2003 Godshaw et al.
6,601,930 B2 8/2003 Tiramani et al.
6,626,295 B1 9/2003 Vasudeva
6,698,608 B2 3/2004 Parker et al.
6,698,609 B2 3/2004 Pangerc et al.
6,722,515 B2 4/2004 Rumpel
6,736,265 B2 5/2004 Kipper et al.
6,755,302 B1 6/2004 Streich et al.
6,761,366 B1 7/2004 Klemmensen et al.
6,789,670 B2 9/2004 Cooper et al.
6,823,992 B2 11/2004 Redzisz
6,945,442 B2 9/2005 Godshaw et al.
6,945,546 B2 9/2005 Guirlinger
6,953,126 B2 10/2005 Parker et al.
6,991,104 B2 1/2006 Redzisz
7,017,740 B2 3/2006 Itzkovitch
7,048,133 B2 5/2006 Pangerc et al.
7,051,878 B2 5/2006 Randhawa
7,121,407 B2 10/2006 Hurt et al.
7,142,944 B2 11/2006 Holmes et al.
7,159,730 B2 1/2007 Rumpel
7,165,674 B2 1/2007 Pangerc et al.
7,210,689 B2 5/2007 Guirlinger
7,225,923 B2 6/2007 Hallee et al.
7,228,983 B2 6/2007 Pangerc et al.
7,237,673 B2 7/2007 Wikle et al.
7,237,688 B2 7/2007 Pangerc et al.
7,246,704 B2 7/2007 Brunson et al.
7,278,643 B2 10/2007 Roberson
7,293,673 B2 11/2007 Savage et al.
7,311,200 B2 12/2007 Godshaw et al.
7,314,133 B2 1/2008 Redzisz
7,314,134 B2 1/2008 Redzisz
7,316,309 B2 1/2008 Streich et al.
7,322,470 B2 1/2008 Brunson
7,326,428 B2 2/2008 Weir
7,328,905 B2 2/2008 Guirlinger
7,331,454 B2 2/2008 Godshaw et al.
7,331,456 B2 2/2008 Pengerc et al.
7,334,680 B2 2/2008 Cunningham et al.
7,357,268 B2 4/2008 Yang
7,367,451 B2 5/2008 Pendergraph et al.
7,370,772 B2 5/2008 Brunson
7,407,171 B2 8/2008 Roberson
7,441,663 B2 10/2008 Osborn
7,472,730 B2 1/2009 Adkins
7,481,316 B2 1/2009 Huruta
7,503,569 B2 3/2009 Duvigneau
7,533,782 B2 5/2009 Parker et al.
7,575,117 B2 8/2009 Redzisz et al.
7,588,162 B2 9/2009 Dubéet al.
7,617,947 B2 11/2009 Schäfer
7,657,344 B2 2/2010 Holmes et al.
D615,275 S 5/2010 Hacker
7,726,479 B2 6/2010 Vasudeva
7,766,161 B2 8/2010 Good
7,780,051 B2 8/2010 Godshaw et al.
7,845,653 B2 12/2010 Katz
7,854,321 B2 12/2010 Twig et al.
7,883,096 B2 2/2011 Katz et al.
7,931,143 B1 4/2011 Lin
7,938,412 B2 5/2011 Katz
8,002,159 B2 8/2011 Cragg
8,056,754 B2 11/2011 Stoner
D651,804 S 1/2012 Chen et al.
8,132,819 B2 3/2012 Landau et al.
8,152,037 B2 4/2012 Sabbag
8,191,845 B1 6/2012 Yu
8,210,387 B2 7/2012 Twig et al.
8,327,576 B2 12/2012 Sellers

(56) References Cited

U.S. PATENT DOCUMENTS 8,397,966 B2 3/2013 Kim
8,403,141 B2 3/2013 Williams et al.
8,434,617 B1 5/2013 Wang
8,454,036 B2 6/2013 Cowie et al.
8,459,488 B2 6/2013 Pannier, II et al.
8,459,489 B2 6/2013 Potts et al.
8,505,728 B2 8/2013 Su
8,505,729 B2 8/2013 Sosnovsky et al.
8,554,364 B2 10/2013 Holmes et al.
8,567,796 B2 10/2013 Bar-Erez et al.
8,602,217 B2 12/2013 Sosnovsky et al.
8,636,290 B2 1/2014 Cowie et al.
8,651,273 B2 2/2014 Williams et al.
8,657,307 B2 2/2014 Lifshitz et al.
8,708,351 B2 4/2014 Kinskey et al.
8,714,355 B2 5/2014 Huang
8,727,172 B2 5/2014 Burgess et al.
8,789,699 B2 7/2014 Patstone et al.
8,833,881 B2 9/2014 Manniso et al.
8,839,956 B2 9/2014 Roehm et al.
8,875,888 B2 11/2014 Koenig et al.
8,936,258 B2 1/2015 Bar-Erez et al.
8,967,438 B2 3/2015 Russell et al.
8,979,100 B2 3/2015 Bensman et al.
8,985,385 B2 3/2015 Parker et al.
8,997,982 B2 4/2015 Makino et al.
9,004,620 B2 4/2015 Baruch et al.
9,072,653 B2 7/2015 Nemard
9,120,219 B1 9/2015 Liao et al.
9,132,543 B2 9/2015 Bar-Erez et al.
9,145,230 B2 9/2015 Madsen
D744,750 S 12/2015 Sabbag et al.
9,199,370 B2 12/2015 Crull
9,206,827 B2 12/2015 Loree et al.
9,227,316 B2 1/2016 Stevens
9,238,301 B2 1/2016 Streich et al.
9,248,566 B2 2/2016 Horiyama et al.
D757,435 S 5/2016 Damberg
9,382,035 B2 7/2016 Fritz
9,399,434 B2 7/2016 Kennedy
9,415,504 B2 8/2016 Chen
9,469,024 B2 10/2016 Bensman et al.
9,511,491 B2 12/2016 Brunner
9,527,205 B1 12/2016 Lin
9,534,833 B2 1/2017 Cho et al.
9,539,722 B2 1/2017 Martinez et al.
9,566,990 B2 2/2017 Bar-Erez et al.
9,573,727 B2 2/2017 Fan
9,616,562 B2 4/2017 Hoppe et al.
9,637,294 B2 5/2017 Kinskey
9,643,629 B2 5/2017 Bar-Erez et al.
9,694,490 B2 7/2017 Wang
9,724,819 B2 * 8/2017 Barry .................... B25H 3/006
9,725,209 B1 8/2017 Ben-Gigi
D797,453 S 9/2017 Shamp et al.
9,770,822 B2 9/2017 Sabbag et al.
9,790,000 B1 10/2017 Holton
D805,776 S 12/2017 Shamp et al.
D805,780 S 12/2017 Hughes
9,872,547 B2 1/2018 Naiva
9,896,259 B2 2/2018 Soules et al.
9,902,525 B2 2/2018 Herman
9,943,955 B2 4/2018 Bozzano
9,962,825 B2 5/2018 Gonzales et al.
9,975,672 B2 5/2018 Crull
9,981,778 B2 5/2018 Plattner
10,011,392 B2 7/2018 Viau
10,022,856 B2 7/2018 Bensman et al.
10,023,356 B2 7/2018 Becklin
10,053,803 B2 8/2018 Thompson
RE47,022 E 9/2018 Sosnovsky et al.
10,065,304 B2 9/2018 Bensman et al.
10,086,508 B2 10/2018 Hoppe et al.
10,092,137 B1 10/2018 Nelson et al.
10,106,180 B2 10/2018 Bar-Erez et al.
10,131,485 B2 11/2018 Soules et al.
10,138,032 B2 11/2018 Chang
D835,411 S 12/2018 Hughes
10,160,470 B2 12/2018 Unrath
10,160,471 B2 12/2018 Yahav et al.
10,179,681 B2 1/2019 Timm et al.
10,182,629 B2 1/2019 Naiva
D844,324 S 4/2019 Hoppe et al.
10,301,069 B2 5/2019 Nakai
10,308,301 B2 6/2019 Walk
10,314,399 B2 6/2019 Wolle et al.
10,350,746 B2 7/2019 Martinez et al.
10,392,175 B2 8/2019 Kinskey
D859,839 S 9/2019 Viau
10,401,075 B2 9/2019 Bond
10,434,638 B1 10/2019 Tsai
10,457,444 B2 10/2019 Banik et al.
10,478,963 B1 11/2019 Workman
10,486,860 B2 11/2019 Frankenberg et al.
10,556,717 B2 2/2020 Lun et al.
10,569,412 B1 2/2020 Reyes
10,575,417 B2 2/2020 Sabbag et al.
10,583,962 B2 3/2020 Brunner et al.
10,588,388 B2 3/2020 Kabalin
10,603,783 B2 3/2020 Brocket et al.
10,625,924 B2 4/2020 Soules et al.
D882,950 S 5/2020 Austin et al.
D882,951 S 5/2020 Austin et al.
D882,952 S 5/2020 Austin et al.
10,654,618 B2 5/2020 Banik et al.
10,661,818 B2 5/2020 Guirlinger
10,703,534 B2 7/2020 Brunner et al.
10,703,538 B2 7/2020 Shamp et al.
10,722,012 B2 7/2020 Kraus et al.
10,723,509 B2 7/2020 Peach et al.
10,730,542 B1 8/2020 Guirlinger
10,773,374 B2 9/2020 Hoppe et al.
10,787,186 B2 9/2020 Bar-Erez et al.
D899,778 S 10/2020 Hedaya
11,006,749 B2 5/2021 Anderson et al.
11,155,382 B1 * 10/2021 Cai .................... B65D 21/0223
2003/0085142 A1 5/2003 Ouimette
2003/0106821 A1 6/2003 Bar-Erez
2004/0188294 A1 9/2004 Chen
2004/0207298 A1 10/2004 Rodon et al.
2004/0217028 A1 11/2004 Ploumitsakos
2005/0103783 A1 5/2005 Bergum et al.
2005/0155889 A1 7/2005 Lown
2005/0224494 A1 10/2005 Heinrichs
2005/0236788 A1 10/2005 Kellogg
2005/0269276 A1 12/2005 Pfeiffer
2006/0113344 A1 6/2006 Cragg
2006/0180487 A1 8/2006 Chan et al.
2006/0219587 A1 10/2006 Redzisz et al.
2007/0045310 A1 3/2007 Yoshino et al.
2007/0125731 A1 6/2007 Waterman
2007/0159040 A1 7/2007 Fernandez et al.
2007/0194543 A1 * 8/2007 Duvigneau .............. A45C 5/14
280/47.26
2007/0257455 A1 11/2007 Cho
2007/0284326 A1 12/2007 Baloun
2008/0000853 A1 1/2008 Huang
2008/0006592 A1 1/2008 Brooks
2008/0035509 A1 2/2008 Redzisz
2008/0035510 A1 2/2008 Brunson
2008/0054142 A1 3/2008 Deland
2008/0115332 A1 5/2008 Kopp
2008/0128305 A1 6/2008 Guirlinger
2008/0128428 A1 6/2008 Beckerman
2008/0223803 A1 9/2008 Budny et al.
2009/0020446 A1 1/2009 Frankenstein et al.
2009/0039122 A1 2/2009 Antonioni
2009/0120835 A1 5/2009 Ublacker et al.
2009/0145866 A1 6/2009 Panosian et al.
2009/0162506 A1 6/2009 Weir
2009/0266833 A1 10/2009 Savage et al.
2010/0052276 A1 3/2010 Brunner
2010/0108556 A1 5/2010 Claffy
2010/0133130 A1 6/2010 Williams et al.

(56) References Cited

U.S. PATENT DOCUMENTS

| | | | |
|---|---|---|---|
| 2010/0133131 A1 | 6/2010 | Williams et al. | |
| 2010/0147727 A1 | 6/2010 | Valdimarsson et al. | |
| 2010/0190920 A1 | 7/2010 | Bellare | |
| 2010/0200446 A1 | 8/2010 | Vasudeva | |
| 2010/0224528 A1 | 9/2010 | Madsen | |
| 2010/0275704 A1 | 11/2010 | Guirlinger | |
| 2011/0062295 A1 | 3/2011 | Totman | |
| 2011/0139777 A1 | 6/2011 | Sosnovsky et al. | |
| 2011/0147385 A1 | 6/2011 | Forrest | |
| 2011/0155730 A1 | 6/2011 | Galler | |
| 2011/0234072 A1 | 9/2011 | Hightower | |
| 2011/0290796 A1 | 12/2011 | Burgess | |
| 2012/0006837 A1 | 1/2012 | Becklin | |
| 2012/0012726 A1 | 1/2012 | Daniels | |
| 2012/0090215 A1 | 4/2012 | Buie, II | |
| 2012/0152944 A1 | 6/2012 | Vilkomirski et al. | |
| 2012/0168444 A1 | 7/2012 | Shitrit et al. | |
| 2012/0187013 A1 | 7/2012 | Gapinski | |
| 2012/0318792 A1 | 12/2012 | Larson et al. | |
| 2013/0047386 A1 | 2/2013 | Barfoot et al. | |
| 2013/0068919 A1 | 3/2013 | Antonioni | |
| 2013/0126542 A1 | 5/2013 | Lorek et al. | |
| 2013/0214119 A1 | 8/2013 | Antonioni | |
| 2013/0256498 A1 | 10/2013 | Antonioni et al. | |
| 2014/0026521 A1 | 1/2014 | Beal et al. | |
| 2014/0035450 A1 | 2/2014 | Holmes et al. | |
| 2014/0124406 A1 | 5/2014 | Ishikawa et al. | |
| 2014/0263119 A1 | 9/2014 | Gruger et al. | |
| 2014/0283631 A1 | 9/2014 | Guirlinger | |
| 2014/0319147 A1 | 10/2014 | Horovitz et al. | |
| 2015/0151877 A1 | 6/2015 | Gallanosa, II et al. | |
| 2015/0190921 A1 | 7/2015 | Wang | |
| 2015/0233630 A1 | 8/2015 | Bond | |
| 2015/0336220 A1 | 11/2015 | Christopher et al. | |
| 2016/0100661 A1 | 4/2016 | Redzisz et al. | |
| 2016/0161177 A1 | 6/2016 | Bond | |
| 2017/0001300 A1 | 1/2017 | Abel et al. | |
| 2017/0029169 A1 | 2/2017 | Shamp et al. | |
| 2017/0063114 A1 | 3/2017 | Briere | |
| 2017/0165829 A1 | 6/2017 | Damberg | |
| 2017/0166352 A1 | 6/2017 | Hoppe et al. | |
| 2017/0233139 A1 | 8/2017 | Averill | |
| 2017/0263084 A1 | 9/2017 | Millius | |
| 2017/0274522 A1 | 9/2017 | Kao | |
| 2017/0355485 A1 | 12/2017 | Finke | |
| 2018/0009101 A1 | 1/2018 | Piccininni et al. | |
| 2018/0044059 A1 | 2/2018 | Brunner | |
| 2018/0127146 A1 | 5/2018 | Oskarsson | |
| 2018/0161975 A1 | 6/2018 | Brunner | |
| 2018/0220758 A1* | 8/2018 | Burchia | B25H 3/02 |
| 2018/0229358 A1 | 8/2018 | Bozzano | |
| 2018/0265256 A1 | 9/2018 | Fisher, Jr. et al. | |
| 2018/0290288 A1 | 10/2018 | Brunner | |
| 2018/0327137 A1 | 11/2018 | Becklin | |
| 2019/0002004 A1 | 1/2019 | Brunner | |
| 2019/0055059 A1 | 2/2019 | McDade | |
| 2019/0083829 A1 | 3/2019 | Kim et al. | |
| 2019/0184904 A1 | 6/2019 | Fang et al. | |
| 2019/0210213 A1 | 7/2019 | Omry et al. | |
| 2019/0225371 A1 | 7/2019 | Hoppe et al. | |
| 2019/0291922 A1 | 9/2019 | Gonitianer et al. | |
| 2019/0308772 A1 | 10/2019 | Gonitianer et al. | |
| 2019/0315515 A1 | 10/2019 | Gonitianer et al. | |
| 2019/0322445 A1 | 10/2019 | Farrar et al. | |
| 2019/0337143 A1 | 11/2019 | Martinez et al. | |
| 2019/0351540 A1 | 11/2019 | Lamb | |
| 2019/0352050 A1 | 11/2019 | Ismert | |
| 2019/0359274 A1 | 11/2019 | Walk | |
| 2020/0039056 A1 | 2/2020 | Damberg | |
| 2020/0039057 A1 | 2/2020 | Bühl et al. | |
| 2020/0055631 A1 | 2/2020 | Combs | |
| 2020/0069020 A1 | 3/2020 | Korb et al. | |
| 2020/0147781 A1 | 5/2020 | Squiers et al. | |
| 2020/0158318 A1 | 5/2020 | Paul et al. | |
| 2020/0165036 A1 | 5/2020 | Squiers et al. | |
| 2020/0180140 A1 | 6/2020 | Brocket et al. | |
| 2020/0189636 A1 | 6/2020 | Brunner | |
| 2020/0206892 A1 | 7/2020 | Karlsson | |
| 2020/0207537 A1 | 7/2020 | Soules et al. | |
| 2020/0223585 A1 | 7/2020 | Brunner et al. | |
| 2020/0239187 A1 | 7/2020 | Banik et al. | |
| 2020/0262459 A1 | 8/2020 | Brunner | |
| 2020/0262611 A1 | 8/2020 | Siskindovich | |
| 2020/0270018 A1 | 8/2020 | Peach et al. | |
| 2020/0353612 A1 | 11/2020 | McCune et al. | |
| 2021/0221561 A1 | 7/2021 | Davidian et al. | |

FOREIGN PATENT DOCUMENTS

| | | | |
|---|---|---|---|
| CA | 2303551 | C | 1/2007 |
| CA | 2551648 | A1 | 1/2007 |
| CA | 2633605 | A1 | 11/2009 |
| CN | 202728895 | U | 2/2013 |
| CN | 202805157 | U | 3/2013 |
| CN | 202878290 | U | 4/2013 |
| CN | 203141473 | U | 8/2013 |
| CN | 203185323 | U | 9/2013 |
| CN | 203427004 | U | 2/2014 |
| CN | 203726468 | U | 7/2014 |
| CN | 104972448 | A | 10/2015 |
| CN | 204937529 | U | 1/2016 |
| CN | 105563441 | A | 5/2016 |
| CN | 205327695 | U | 6/2016 |
| CN | 105836315 | A | 8/2016 |
| CN | 205418337 | U | 8/2016 |
| CN | 205837465 | U | 12/2016 |
| CN | 205972255 | U | 2/2017 |
| CN | 206242009 | U | 6/2017 |
| CN | 206501093 | U | 9/2017 |
| CN | 206550984 | U | 10/2017 |
| CN | 206606533 | U | 11/2017 |
| CN | 107539589 | A | 1/2018 |
| CN | 107738234 | A | 2/2018 |
| CN | 206952962 | U | 2/2018 |
| CN | 107901007 | A | 4/2018 |
| CN | 106002894 | B | 5/2018 |
| CN | 207550866 | U | 6/2018 |
| CN | 108313450 | A | 7/2018 |
| CN | 207696499 | U | 8/2018 |
| CN | 108527446 | A | 9/2018 |
| CN | 208132925 | U | 11/2018 |
| CN | 108942847 | A | 12/2018 |
| CN | 208438318 | U | 1/2019 |
| CN | 208529051 | U | 2/2019 |
| CN | 109398895 | A | 3/2019 |
| CN | 208557433 | U | 3/2019 |
| CN | 208773541 | U | 4/2019 |
| CN | 208931948 | U | 6/2019 |
| CN | 208947879 | U | 6/2019 |
| CN | 209319731 | U | 8/2019 |
| CN | 209601087 | U | 11/2019 |
| CN | 209632992 | U | 11/2019 |
| CN | 209793675 | U | 12/2019 |
| CN | 210116766 | U | 2/2020 |
| CN | 110902160 | A | 3/2020 |
| CN | 111168635 | A | 5/2020 |
| CN | 210500207 | U | 5/2020 |
| CN | 210503661 | U | 5/2020 |
| CN | 210681461 | U | 6/2020 |
| CN | 210704745 | U | 6/2020 |
| CN | 210704749 | U | 6/2020 |
| CN | 210708662 | U | 6/2020 |
| CN | 210998614 | U | 7/2020 |
| CN | 111498253 | A | 8/2020 |
| CN | 211163863 | U | 8/2020 |
| CN | 211163872 | U | 8/2020 |
| CN | 211197165 | U | 8/2020 |
| CN | 211281966 | U | 8/2020 |
| CN | 211306264 | U | 8/2020 |
| CN | 211439912 | U | 9/2020 |
| CN | 211869962 | U | 11/2020 |
| DE | 2413419 | B1 | 6/1975 |
| DE | 8021735 | U1 | 12/1980 |
| DE | 3030756 | A1 | 3/1982 |

(56) References Cited

FOREIGN PATENT DOCUMENTS

| | | | |
|---|---|---|---|
| DE | 3116218 | C2 | 4/1984 |
| DE | 8426728 | U1 | 10/1984 |
| DE | 8603926 | U1 | 4/1986 |
| DE | 3802967 | A1 | 8/1989 |
| DE | 8914625 | U1 | 2/1990 |
| DE | 9105857 | U1 | 8/1991 |
| DE | 4014734 | A1 | 11/1991 |
| DE | 4128582 | A1 | 3/1992 |
| DE | 9206964 | U1 | 9/1992 |
| DE | 9213497 | U1 | 3/1993 |
| DE | 9415661 | U1 | 11/1994 |
| DE | 4438983 | A1 | 5/1996 |
| DE | 202004010232 | U1 | 8/2004 |
| DE | 202005008115 | U1 | 11/2005 |
| DE | 202006007914 | U1 | 7/2006 |
| DE | 202006010567 | U1 | 10/2006 |
| DE | 102007032382 | A1 | 1/2008 |
| DE | 202008013775 | U1 | 4/2009 |
| DE | 202010005191 | U1 | 7/2010 |
| DE | 202010004075 | U1 | 9/2010 |
| DE | 202010008125 | U1 | 11/2010 |
| DE | 202011052191 | U1 | 3/2012 |
| DE | 202012101692 | U1 | 6/2012 |
| DE | 202014100904 | U1 | 4/2014 |
| DE | 202014105326 | U1 | 11/2014 |
| DE | 202014002760 | U1 | 6/2015 |
| DE | 202016005078 | U1 | 9/2016 |
| DE | 102016112063 | A1 | 1/2018 |
| EP | 0124446 | B1 | 12/1987 |
| EP | 0304224 | A2 | 2/1989 |
| EP | 0319969 | B1 | 5/1992 |
| EP | 0555533 | B1 | 8/1994 |
| EP | 0554185 | B1 | 10/1995 |
| EP | 0698558 | A2 | 2/1996 |
| EP | 0721893 | B1 | 3/1999 |
| EP | 1159894 | A1 | 12/2001 |
| EP | 1116666 | B1 | 3/2005 |
| EP | 1563965 | B1 | 12/2006 |
| EP | 1547730 | B1 | 10/2007 |
| EP | 2490187 | A1 | 8/2012 |
| EP | 2055443 | B1 | 4/2015 |
| EP | 2354025 | B1 | 9/2015 |
| EP | 2020188 | B1 | 4/2016 |
| EP | 2602067 | B1 | 4/2016 |
| EP | 2774866 | B1 | 9/2016 |
| EP | 2338650 | B1 | 10/2016 |
| EP | 2805799 | B1 | 11/2016 |
| EP | 3216713 | A1 | 9/2017 |
| EP | 3599185 | A1 | 1/2020 |
| FR | 2266475 | A1 | 10/1975 |
| FR | 2341495 | A1 | 9/1977 |
| FR | 2839294 | B1 | 9/2004 |
| FR | 2944466 | A1 | 10/2010 |
| GB | 2008663 | B | 1/1982 |
| GB | 2134884 | B | 7/1986 |
| GB | 2365415 | A | 2/2002 |
| GB | 2437513 | B | 1/2011 |
| GB | 2482126 | B | 3/2014 |
| WO | WO9716288 | A1 | 5/1997 |
| WO | WO2009100492 | A1 | 8/2009 |
| WO | WO2011135559 | A1 | 11/2011 |
| WO | WO2012171454 | A1 | 12/2012 |
| WO | WO2014170703 | A1 | 10/2014 |
| WO | WO2015176351 | A1 | 11/2015 |
| WO | WO2016165901 | A1 | 10/2016 |
| WO | WO2017016581 | A1 | 2/2017 |
| WO | WO2017149539 | A1 | 9/2017 |
| WO | WO2017207136 | A1 | 12/2017 |
| WO | WO2019020380 | A1 | 1/2019 |
| WO | WO2019028041 | A1 | 2/2019 |
| WO | WO2019123465 | A1 | 6/2019 |
| WO | WO2019147801 | A2 | 8/2019 |
| WO | WO2019150370 | A1 | 8/2019 |
| WO | WO2020052779 | A1 | 3/2020 |

OTHER PUBLICATIONS

Extended European Search Report for Application No. 21199012.2 dated Sep. 22, 2022 (15 pages).

* cited by examiner

TOOL STORAGE SYSTEM

CROSS-REFERENCE TO RELATED APPLICATIONS

This application claims priority to U.S. Provisional Patent Application No. 63/083,551, filed Sep. 25, 2021, the entire contents of which are incorporated herein by reference.

TECHNICAL FIELD

The present disclosure relates to storage systems, and more particular to storage systems for tools, tool accessories, and the like.

BACKGROUND

Hand tools, power tools, and associated accessories such as batteries, tool bits, fasteners, and the like, may be moved frequently between a storage space and a work space. One aspect of accessibility is a user's ability to quickly store an object and remove the object from storage. Another aspect of accessibility is the storage system's ability to engage many differently sized containers with a standardized connection mechanism between the system and the container. This may also permit an object or container to engage the storage system at a plurality of locations. Finally, storage systems are accessible when located adjacent a work space.

SUMMARY

In one independent aspect, a rolling toolbox includes: a container including a base, a plurality of sidewalls, a lid coupled to one of the sidewalls, and a latch, the lid movable between a closed portion and an open position, the latch selectively securing the lid in the closed position, the lid including a feature configured to engage a complementary feature positioned on the base of another container and releasably secured to the other container in a stacked relationship, at least one of the container and the other container includes a locking member that is slidable between an engaged position in which the locking member secures the base of the other container to the lid and a disengaged position in which the other container is removable from the lid; a wheel rotatably coupled to the container and supporting the container for movement on a support surface; and a handle coupled to the container to guide movement of the container, the handle being movable between a retracted position and an extended position.

In another independent aspect, a storage container includes: a base; at least one sidewall extending from the base, the sidewall at least partially defining an outer wall of an interior compartment; a lid coupled to the sidewall and movable between an open position and a closed position, the interior compartment being accessible while the lid is in the open position, the interior compartment being covered while the lid is in the closed position; and an elastic support coupled to at least one of the base, the sidewall, and the lid, the elastic support being expandable to receive an item between the elastic support and the at least one of the base, the sidewall, or the lid and exert a compressive retaining force on the item.

In yet another independent aspect, a storage container assembly include: a container including a base, at least one sidewall extending from the base and at least partially defining an outer wall of an interior compartment, and a lid coupled to the sidewall and movable between an open position and a closed position, the interior compartment being accessible while the lid is in the open position, the interior compartment being covered while the lid is in the closed position, the container including a first connection feature and a second connection feature; and a storage bin including a compartment and a mating feature, the container being selectively mountable in a first configuration in which the mating feature engages the first connection feature and a second configuration in which the mating feature engages the second connection feature.

In still another independent aspect, a storage container includes: a base; a plurality of sidewalls extending from the base and defining an outer wall of an interior compartment, a first sidewall joined to a second sidewall at a corner portion; a lid coupled to the sidewalls and movable between an open position and a closed position, the interior compartment being accessible while the lid is in the open position, the interior compartment being covered while the lid is in the closed position; and a latch movable between an engaged position in which the lid is secured relative to the second sidewall and a disengaged position in which the lid is unsecured relative to the second sidewall, the latch positioned adjacent the corner portion and oriented at an acute angle relative to each of the first sidewall and the second sidewall.

Other aspects of the disclosure will become apparent by consideration of the detailed description and accompanying drawings.

DETAILED DESCRIPTION

Before any aspects are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, whether direct or indirect.

Figure 1:
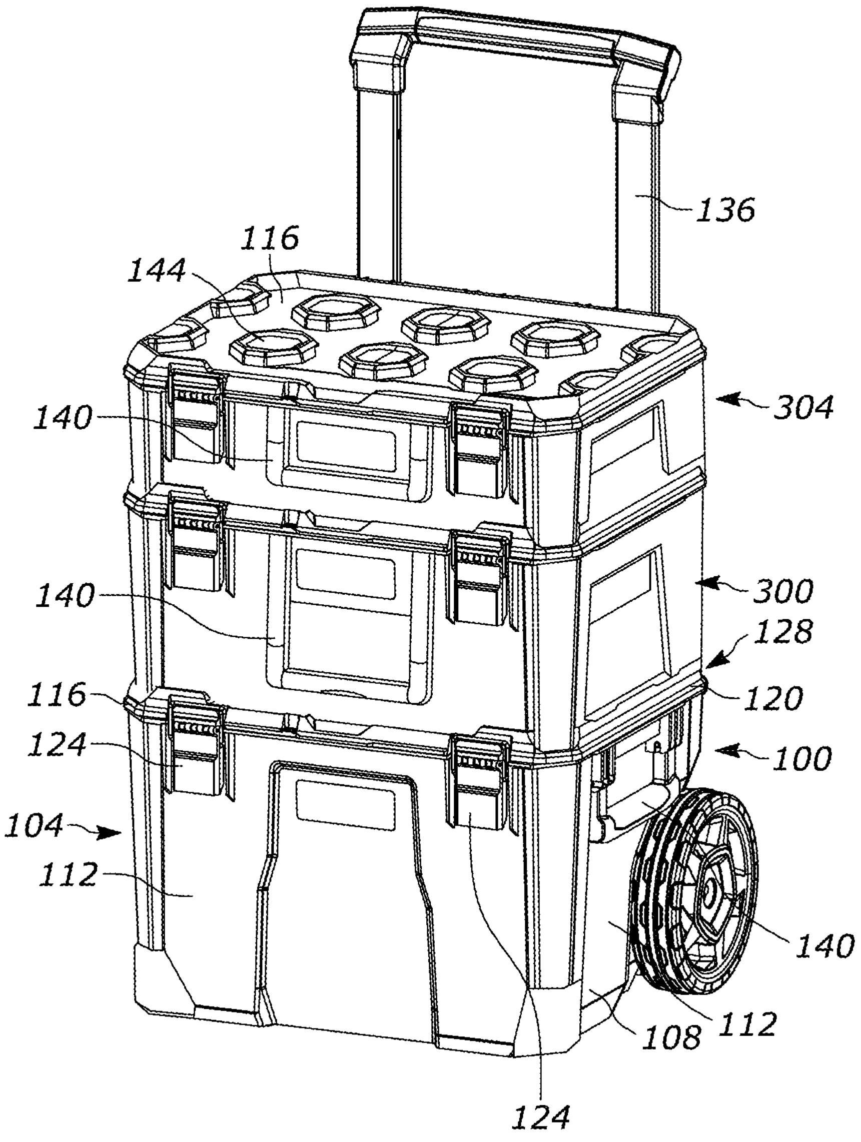
FIG. 1 is a perspective view of a rolling toolbox supporting multiple storage containers.
Figure 2:
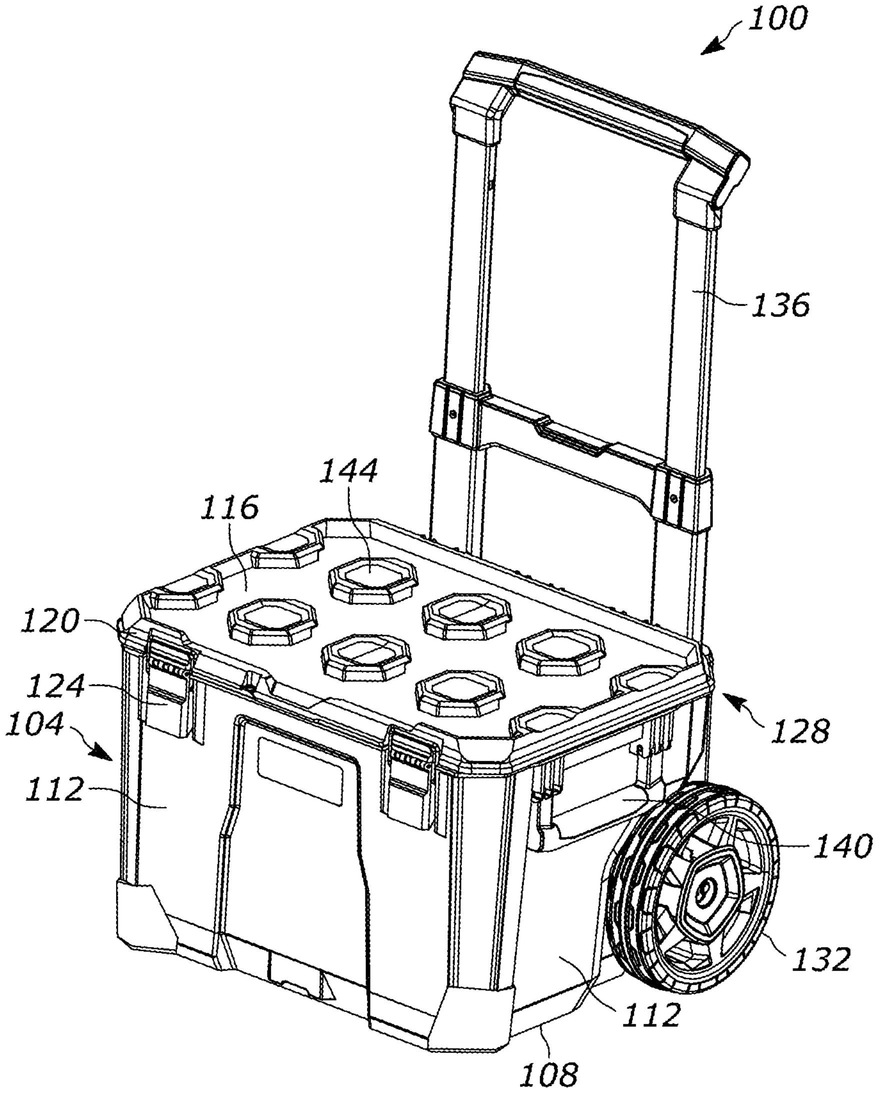
FIG. 2 is a perspective view of the rolling toolbox of FIG. 1.

FIGS. 1 and 2 illustrate a rolling storage container (e.g., toolbox 100). As illustrated in FIG. 1, the rolling toolbox 100 may be part of a tool storage system, and an upper surface (e.g., the lid) of the toolbox 100 may include an interface for receiving one or more stacked containers 104, 300, 304. Each container 104, 300, 304 may include at least one feature for mating the container 104, 300, 304 to an adjacent container 104, 300, 304. Some exemplary mating features for the container 104, 300, 304 are disclosed in U.S. patent application Ser. No. 17/153,251, filed Jan. 20, 2021. The entire contents of these applications are incorporated by reference herein. One example of such a mating feature for securing a container 104, 300, 304 to another container 104, 300, 304 for use in the rolling toolbox 100 is described below with regards to FIGS. 31A-31B and includes a latching mechanism. As illustrated in FIG. 2, the rolling toolbox 100 may include a single container 104 having a base 108 and a plurality of sidewalls 112 extending from the base 108. In the illustrated embodiment, the base 108 is generally planar and four sidewalls 112 each extend in a direction perpendicular to the base 108 forming a cubic profile, or a substantially cubic profile. Other configurations of the container 104 are possible. The rolling toolbox 100 further includes a lid 116 which is coupled to the sidewalls 112. As shown in FIG. 2, the lid 116 includes a periphery 120 which projects from the lid 116. As shown in FIG. 1, the periphery 120 may be dimensioned to engage another container on top of container 104.

The container 104 includes a latch 124 configured to secure the lid 116 to the sidewall 112. Each container 104 further includes a hinge coupling 128 between one of the sidewalls 112 and the lid 116. The hinge coupling 128 permits the lid 116 to pivot relative to the sidewall 112. The latch 124 is movable between an engaged position in which the latch 124 secures the lid 116 to the sidewall 112 and an open position in which the latch 124 is removed from the lid 116 and the lid 116 is movable relative to the sidewalls 112. In the illustrated embodiment, each container 104 includes at least two latches 124. The latches 124 are spaced from each other along the sidewall 112 such that load in securing the lid 116 to the sidewall 112 is distributed between the two latches 124. The latch 124 may be a draw latch, a latch-style toggle clamp, or the like. The latch 124 may engage the periphery 120 to hold the lid 116 against the sidewalls 112. The latches 124 may be provided on a sidewall 112 opposite the hinge coupling 128.

The rolling toolbox 100 includes wheels 132 which are rotatably coupled to the container 104. In the illustrated embodiment of FIG. 1, the container 104 that supports the other containers 300, 304 is provided with the wheels 132. The wheels 132 permit the container 104 and the rolling toolbox 100 (i.e., the container 104 along with the containers 300, 304) to be moved from a storage location (i.e., a first location) to a work site (i.e., a second location). As such, the toolbox 100 is a rolling toolbox 100 that may roll forwards and/or rearwards.

As illustrated in FIG. 1, the rolling toolbox 100 includes a handle 136. The handle 136 may be secured to the container 104 as shown in FIG. 2. The handle 136 may extend above the sidewalls 112 such that a user can pull upon the handle 136 while the container 104 is translated upon the ground by the wheels 132. Each container 104 may be provided with an auxiliary handle 140. In the illustrated embodiment, the auxiliary handles 140 of the containers 300, 304 are provided on the sidewall 112 which engages the latch 124 (i.e., a sidewall 122 opposite the hinge coupling 128). In the illustrated embodiment, the auxiliary handle 140 of the container 104 is provided on a sidewall 112 that does not engage the latch 124. In the illustrated embodiment, opposing sidewalls 112 are provided with auxiliary handles 140 such that a user may grasp two auxiliary handles 140 on opposite sides of the container 104. The auxiliary handles 140 each may be pivotable relative to the sidewalls 112. Other arrangements of the auxiliary handle 140 are possible. Accordingly, the user may grasp the handle 136 while translating the rolling toolbox 100 along the ground by the wheels 132 from a storage space to a position adjacent the work space, and the user may carry the container 104 by grasping the auxiliary handle 140. Finally, in the illustrated embodiment, the exterior surface of the lid 116 is provided with a plurality of protrusions (e.g., cleats 144). The cleats 144 are described in detail below, and generally function as hooks to secure other parts (e.g., bins 286, 320, 348, 376, 380 as well as other parts such as hand tool holders, power tool holders, power tools, sporting good holders, etc.) to the rolling toolbox 100.

Figure 3:
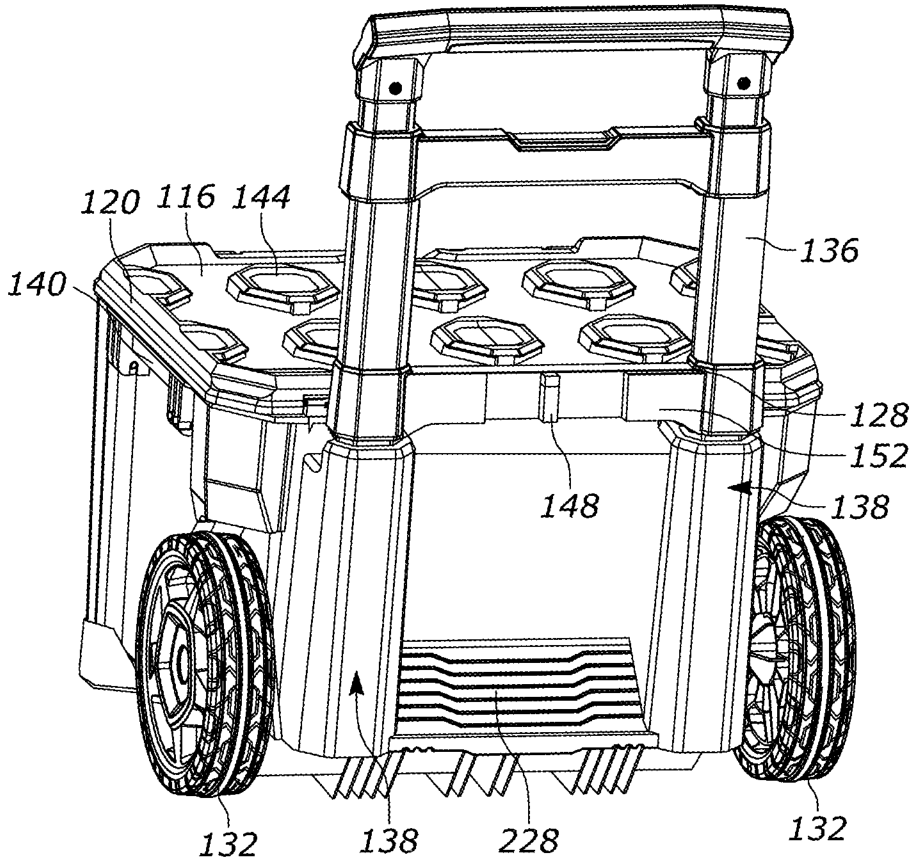
FIG. 3 is another perspective view of another embodiment of a rolling toolbox with a handle in a retracted position.

As described below, the handle 136 is a telescopic handle 136. In the illustrated embodiments, the handle 136 is generally U-shaped, with arms of the "U" being received in the receptacle 138. In the illustrated embodiments, the container 104 includes two receptacles 138 which each receive one of the arms of the "U". The handle 136 may be locked in a desired position by any one of a plurality of connection mechanisms which are described below and illustrated in FIGS. 3-6, FIGS. 7-11, FIGS. 12-13, respectively. In each of these connection mechanisms, the handle 136 is capable of being telescoped between a retracted position (e.g., FIG. 3) and a deployed position (e.g., FIG. 4). The handle 136 can then be secured in the desired position by the connection mechanism. Other connection mechanisms may be used to secure the handle 136 to the sidewalls 112. In the retracted position (FIG. 3), at least a portion of the handle 136 is received in a corresponding receptacle 138 of the container 104. The receptacle 138 extends generally perpendicularly away from the base 108. In the illustrated embodiment, the receptacle 138 is adjacent the sidewall 112 which is provided with the hinge coupling 128. In the deployed position (FIG. 4), the handle 136 is translated to a location further from the base 108 than in the retracted position (FIG. 3). In the illustrated embodiments, the handle 136 may be either infinitely translatable between the deployed position and the retracted position or the handle 136 may be translatable to discrete positions between the deployed position and the retracted position. The handle 136 and the receptacle 138 may be dimensioned such that the handle 136 is not removable from the receptacle 138 upon intended translation to the deployed position.

Figure 4:
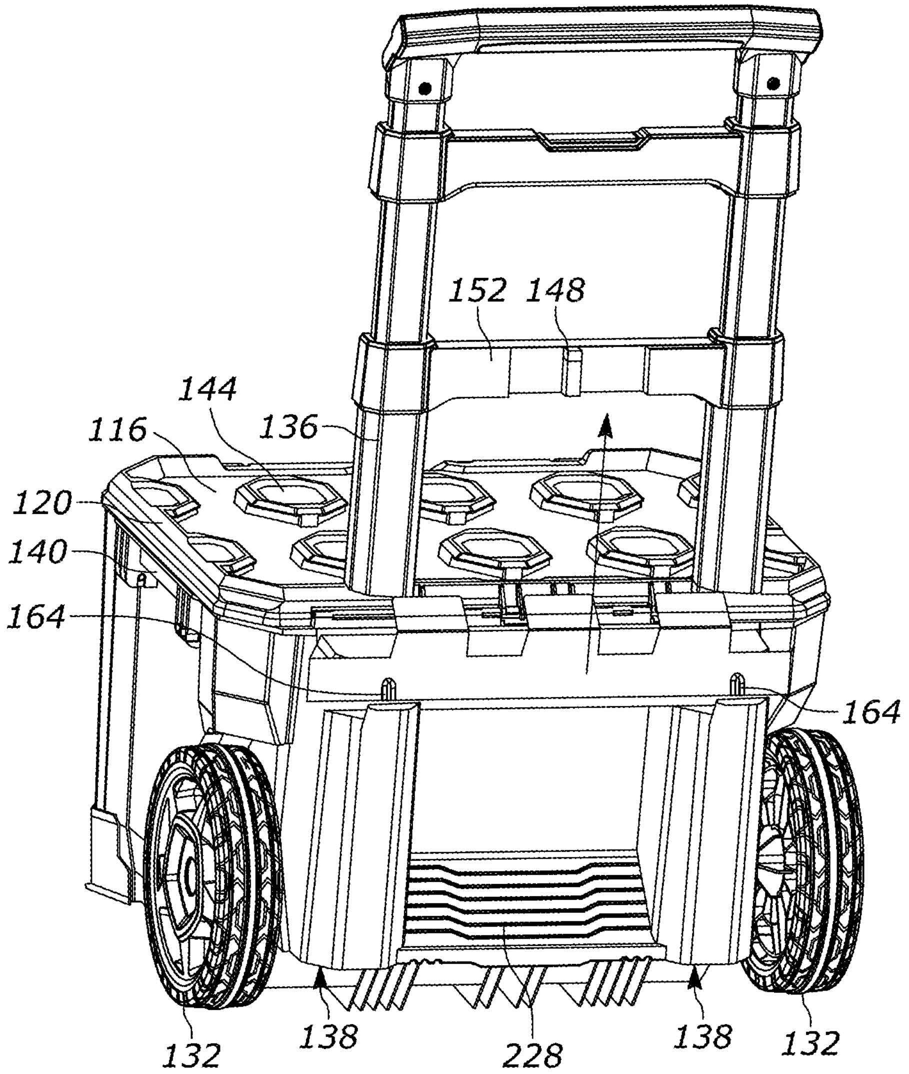
FIG. 4 is another perspective view of the rolling toolbox of FIG. 3 with the handle in an extended position.
Figure 5:
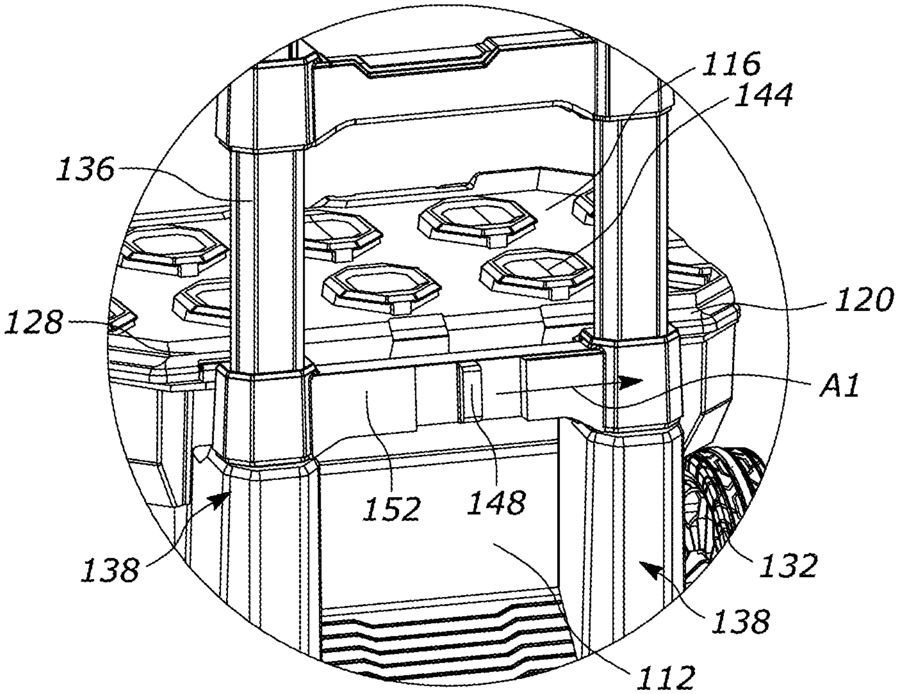
FIG. 5 is another perspective view of the rolling toolbox of FIG. 3 with a handle locking mechanism.
Figure 6:
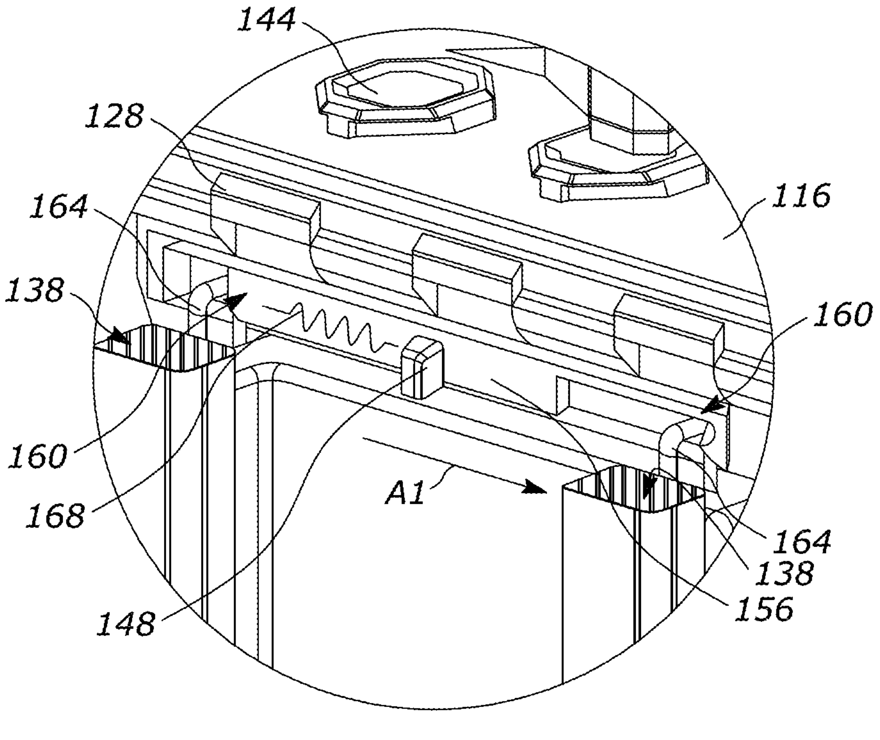
FIG. 6 is another perspective view of the rolling toolbox of FIG. 3 with the handle locking mechanism in an unlocked position.
Figure 7:
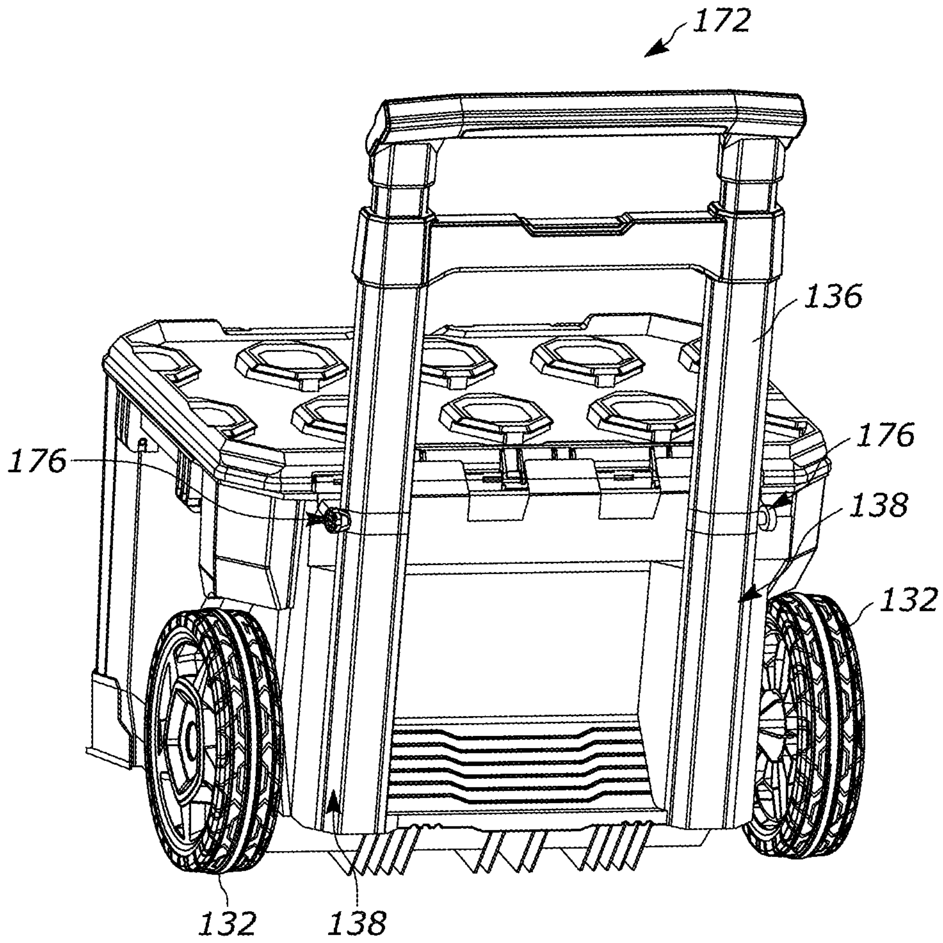
FIG. 7 is a perspective view of a rolling toolbox according to another embodiment, with a handle in a retracted position.
Figure 8:
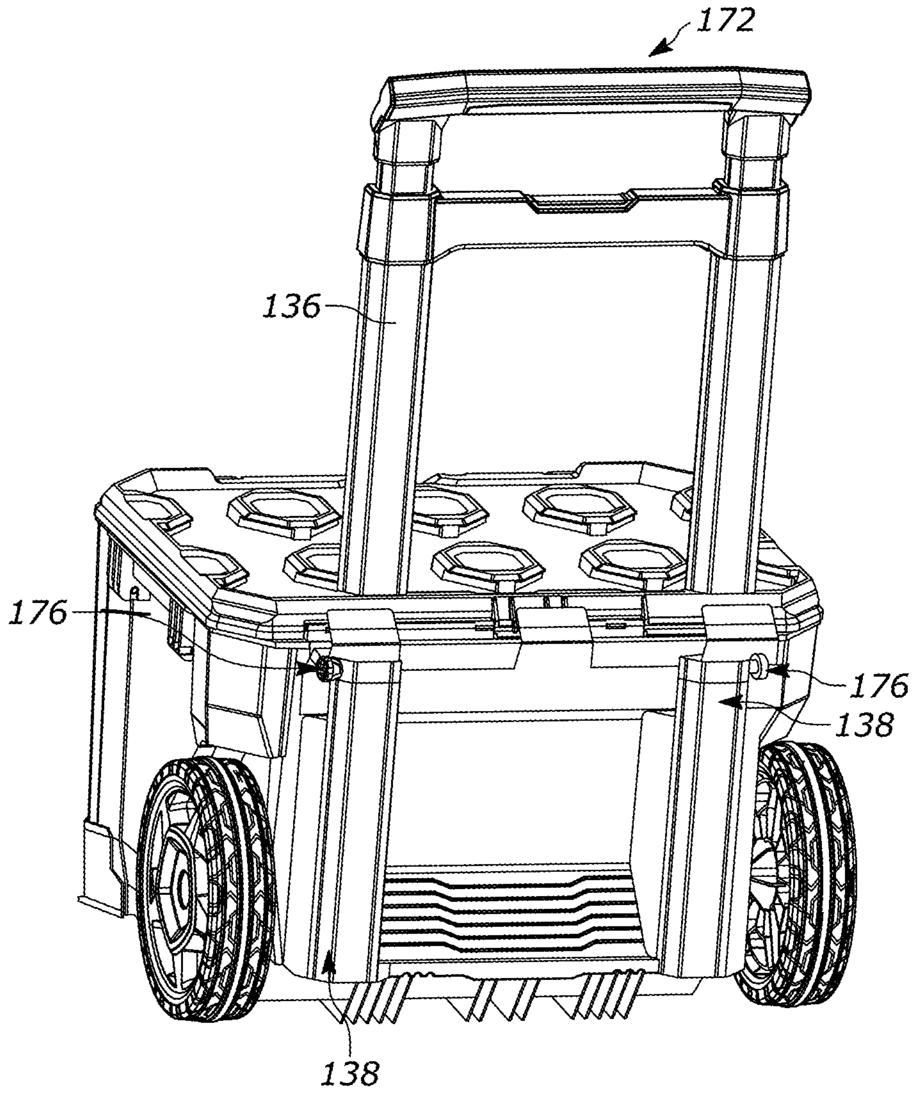
FIG. 8 is a perspective view of the rolling toolbox of FIG. 7 with the handle in an extended position.
Figure 9:
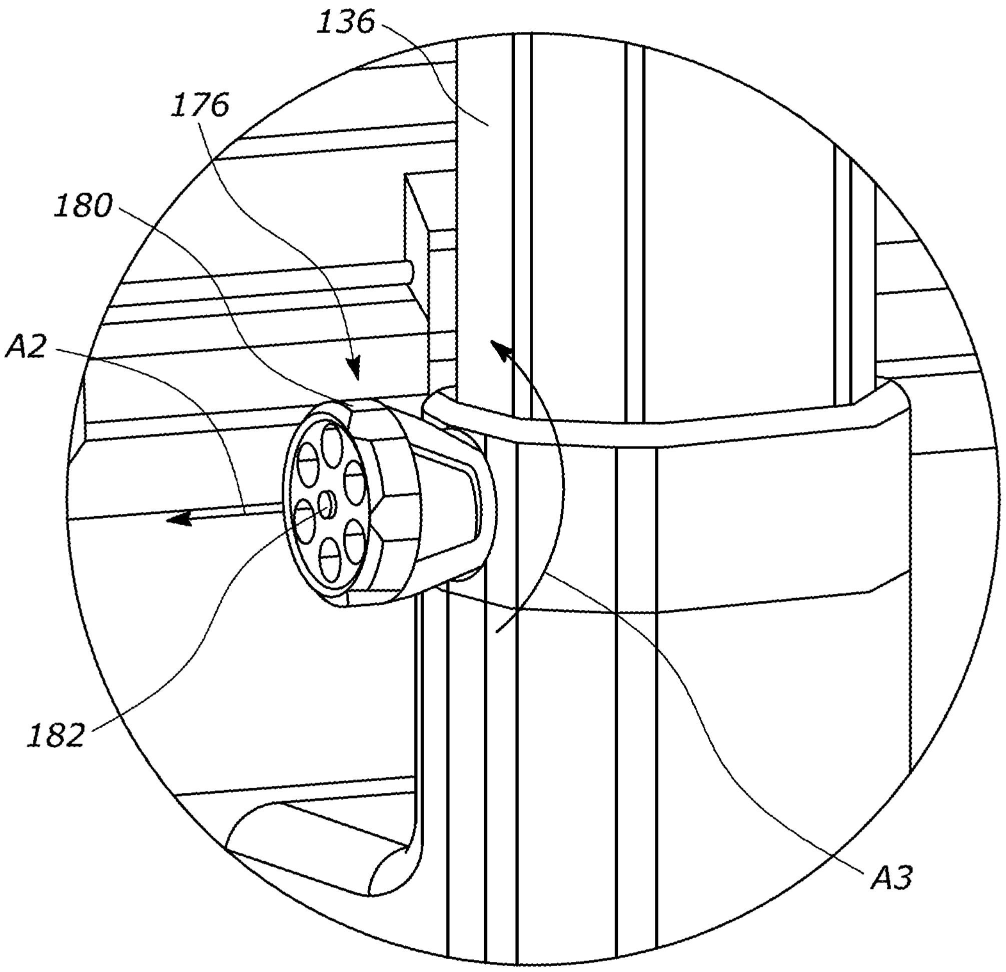
FIG. 9 is a perspective view of a spring plunger mechanism of the rolling toolbox of FIG. 7.

FIGS. 3-6 illustrate a first embodiment of a lock device configured to secure the handle 136 at a desired position relative to the receptacle 138. The first embodiment of the lock device includes an actuator 148 which is located at a central position along a cover 152 (FIG. 3). The actuator 148 projects beyond the bounds of the cover 152 such that a user may manipulate the actuator 148 from exterior to the cover 152. The cover 152 includes a latch bar 156 therein. The latch bar 156 includes a latch hook 160. The container 104 is provided with a latch catch 164 coupled to the sidewall 112. The latch catch 164 may be coupled to the same sidewall 112 that engages the hinge coupling 128 and adjacent the handle 136. Further, the latch catch 164 may be located adjacent the receptacles 138. The latch bar 156 is movable in directions parallel to the arrow A1. As illustrated in FIG. 6, a user may manipulate the actuator 148 to translate the latch bar 156 along the cover 152 and along the arrow A1 to a position in which the latch hook 160 is misaligned with the latch catch 164. Further, as illustrated in FIG. 6, the first embodiment of the connection mechanism may include a spring 168 configured to bias the latch bar 156 in a direction opposite the arrow A1 such that the latch hook 160 is engaged with the latch catch 164. FIG. 5 illustrates the handle 136 retracted into the receptacle 138 prior to actuation of the actuator 148 against the bias of the spring 168. The latch bar 156 is movable between a locked position in which the latch bar is locked to the latch catch 164 (FIG. 5) and a released position (FIG. 6) in which the latch bar 156 is removed from the latch catch 164. In the released position, the handle 136 is translatable along the receptacle 138 to the deployed position (FIG. 4). As illustrated in FIG. 4, the cover 152 may be fixed relative to the handle 136 such that the latch bar 156 is used to secure the handle 136 in the retracted position (FIG. 3) with the cover 152 adjacent the receptacle 138.

Figure 10:
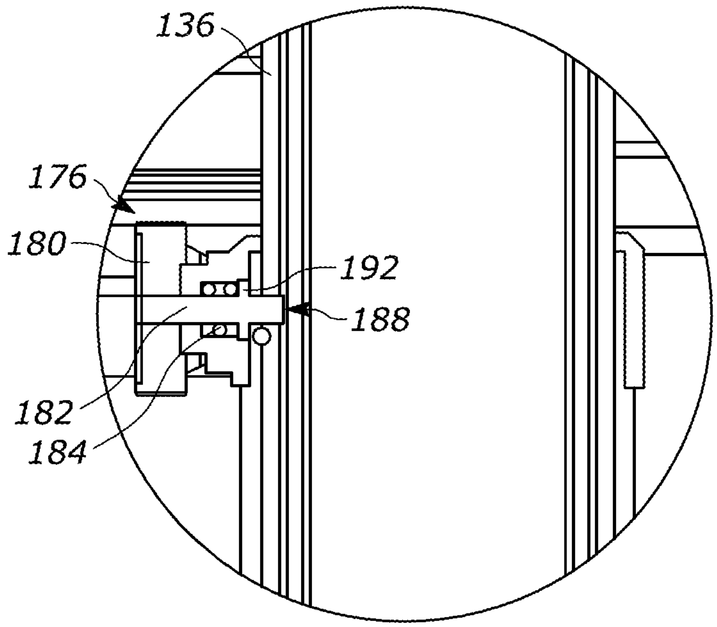
FIG. 10 is a cross-sectional view of the spring plunger mechanism of FIG. 9 with the handle in a locked position.
Figure 11:
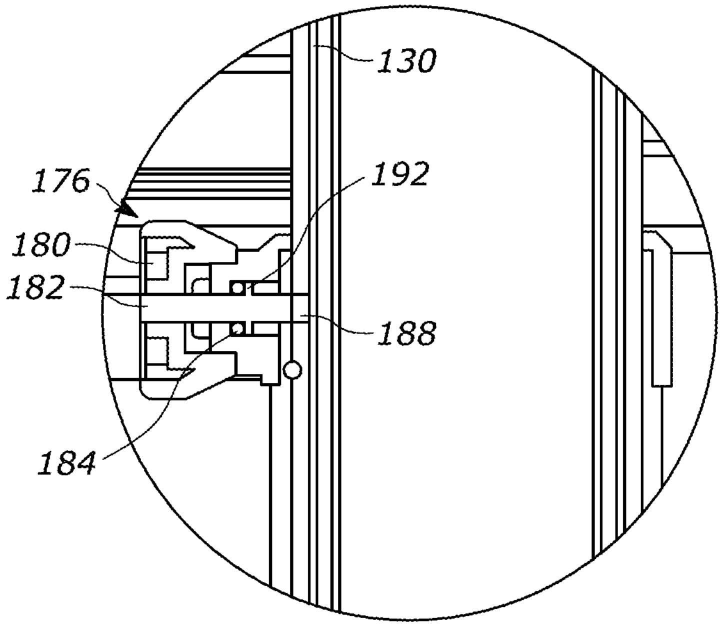
FIG. 11 is another cross-sectional view of the spring plunger mechanism of FIG. 9 with the handle in an unlocked position.

FIGS. 7-11 illustrate a second embodiment of the connection mechanism (i.e., a rolling toolbox 172 including a spring plunger mechanism 176) configured to secure the handle 136 at a desired position relative to the receptacle 138. The spring plunger mechanism 176 includes a knob 180, a plunger 182 coupled to the knob 180, and a spring 184 which biases the plunger 182 against the handle 136. The handle 136 in the second embodiment of the connection mechanism includes a through hole 188. Optionally, the handle 136 may include a plurality of holes 188 corresponding to different projection distances of the handle 136 extending from the receptacle 138. The knob 180 is dimensioned such that at some radial positions of the knob 180, the plunger 182 may be translated to a position (FIG. 10) within the hole 188. The plunger 182 may be retracted from the hole 188 (FIG. 11) to permit removal of the handle 136 from the receptacle 138. The container 104 can then be used without the handle 136. As shown in FIGS. 10 and 11, the plunger 182 includes a shoulder 192 which abuts the spring 184. The other end of the spring 184 is adjacent the knob 180 such that a user must provide force to overcome the bias of the spring to move the knob 180 in a direction of the arrow A2 in FIG. 9. Once the knob 180 is translated with the plunger 182 retracted from the hole 188, the knob 180 can then be rotated along or in the opposite direction of arrow A3. The knob 180 can then hold the plunger 182 in the retracted position away from the hole 188 (FIG. 11). In sum, the knob 180 is movable between a locked position (FIG. 10) in which the plunger 182 is received in the hole 188 and a released position (FIG. 11 in which the plunger 182 is removed from the hole 188.

Figure 12:
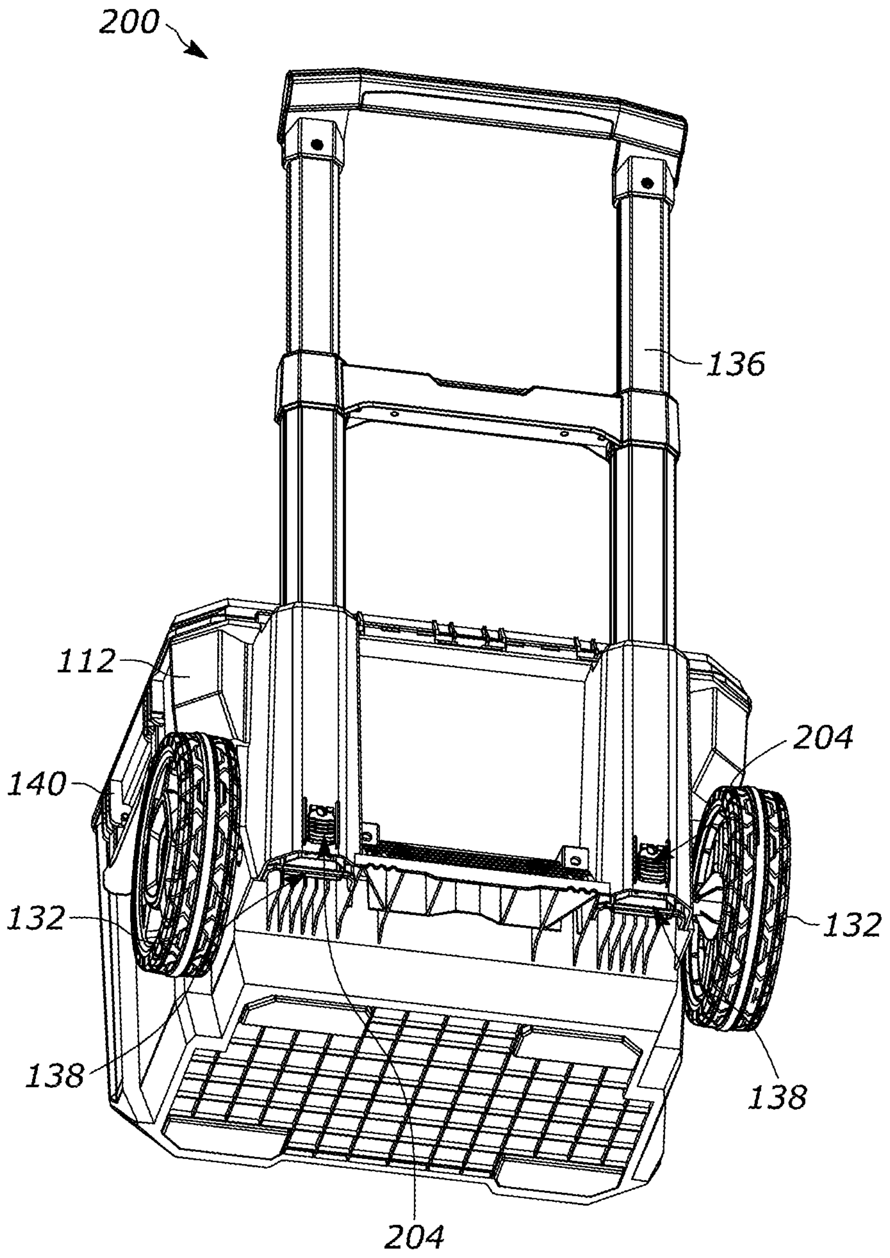
FIG. 12 is a perspective view of a rolling toolbox according to another embodiment, with a handle in an extended position.
Figure 13:
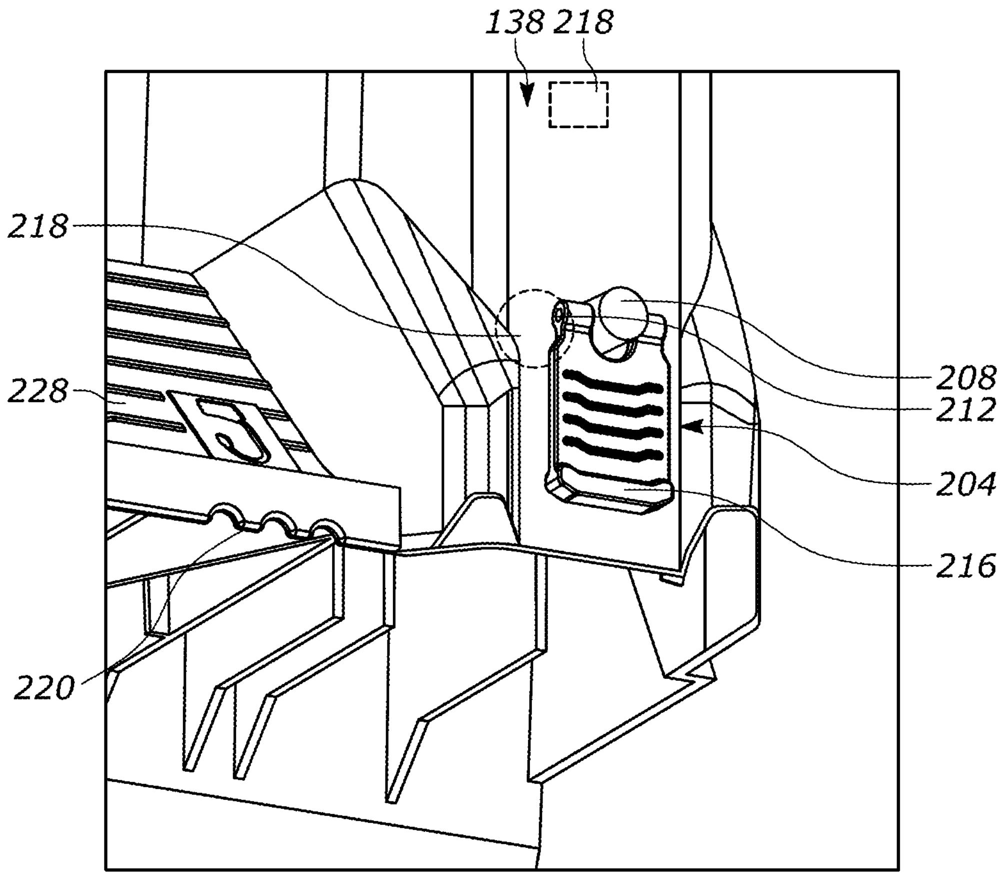
FIG. 13 is another perspective view of the rolling toolbox of FIG. 12 with a handle closure mechanism in a locked position.

FIGS. 12-13 illustrate a third embodiment of the connection mechanism (i.e., a rolling toolbox 200 including a locking pin mechanism 204) configured to secure the handle 136 at a desired position relative to the receptacle 138. The rolling toolbox 200 may include like features when compared to the rolling toolbox 100. The locking pin mechanism 204 includes a locking pin 208 and a pivot pin 212 that is received by the locking pin 208 and is coupled to an actuator 216. In the illustrated embodiment, the actuator 216 is a flap which is coupled with the pivot pin 212 extending through one end of the flap. The handle 136 includes a mating element 218. The mating element 218 is located within the receptacle 138 when the handle 136 is in the retracted position. In the illustrated embodiment, when the handle is in the retracted position, the mating element 218 may be located adjacent the base 108. The locking pin 208 is movable in response to movement of the actuator 216. The actuator 216 is movable between a locked position (FIG. 13) in which the locking pin 208 is secured to the mating element 218 and a released position in which the locking pin 208 is removed from the mating element 218, and the handle 136 freely translates along the receptacle 138. The locking pin 208 may pass through the sidewall 112 and into the receptacle 138. In other embodiments, other such connection mechanisms may secure the handle 136 to the sidewalls 112 via the receptacles 138 in a telescopic relationship.

Figure 14:
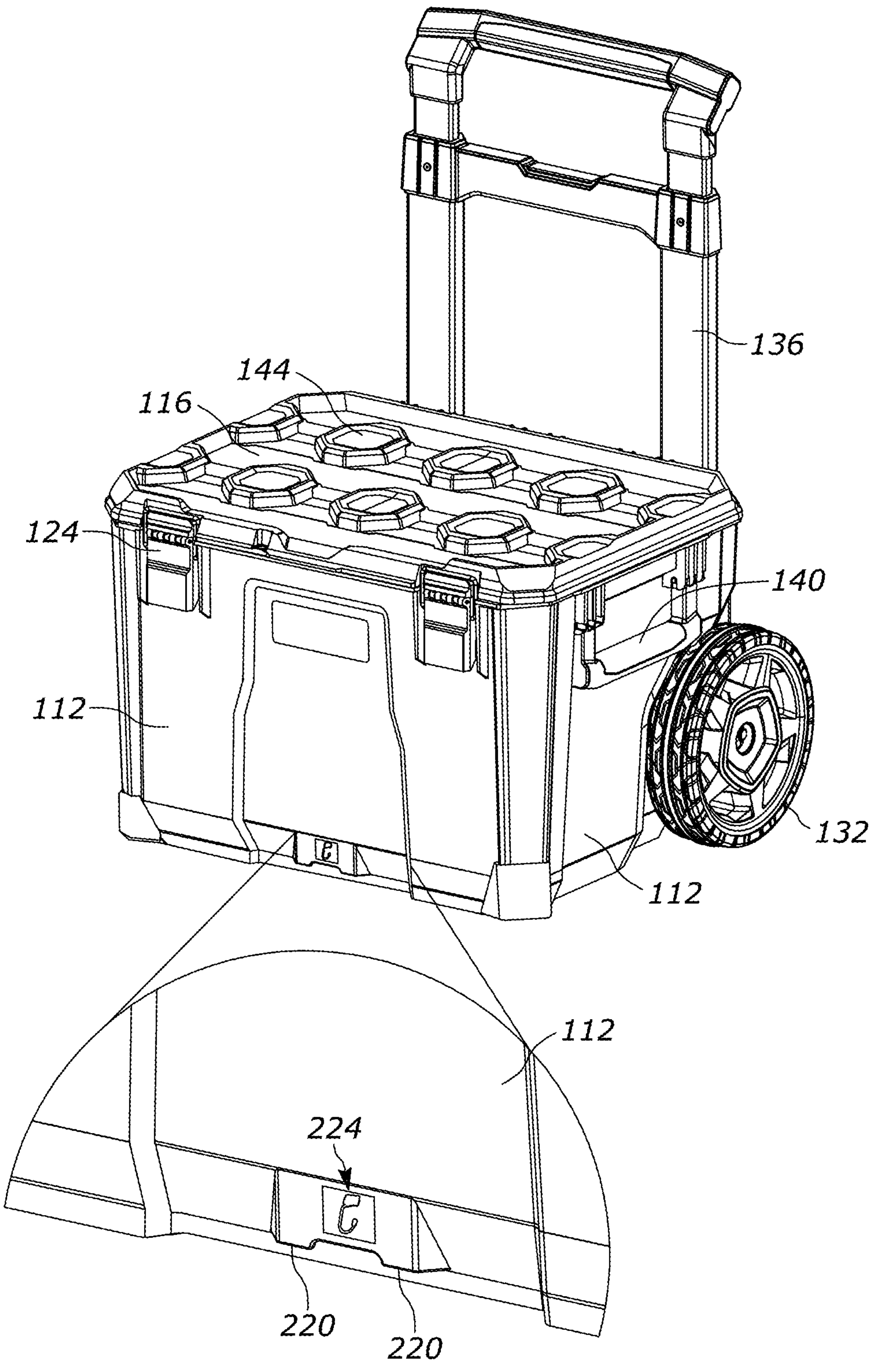
FIG. 14 is a front perspective view of the rolling toolbox of FIG. 3 including a front hook.
Figure 15:
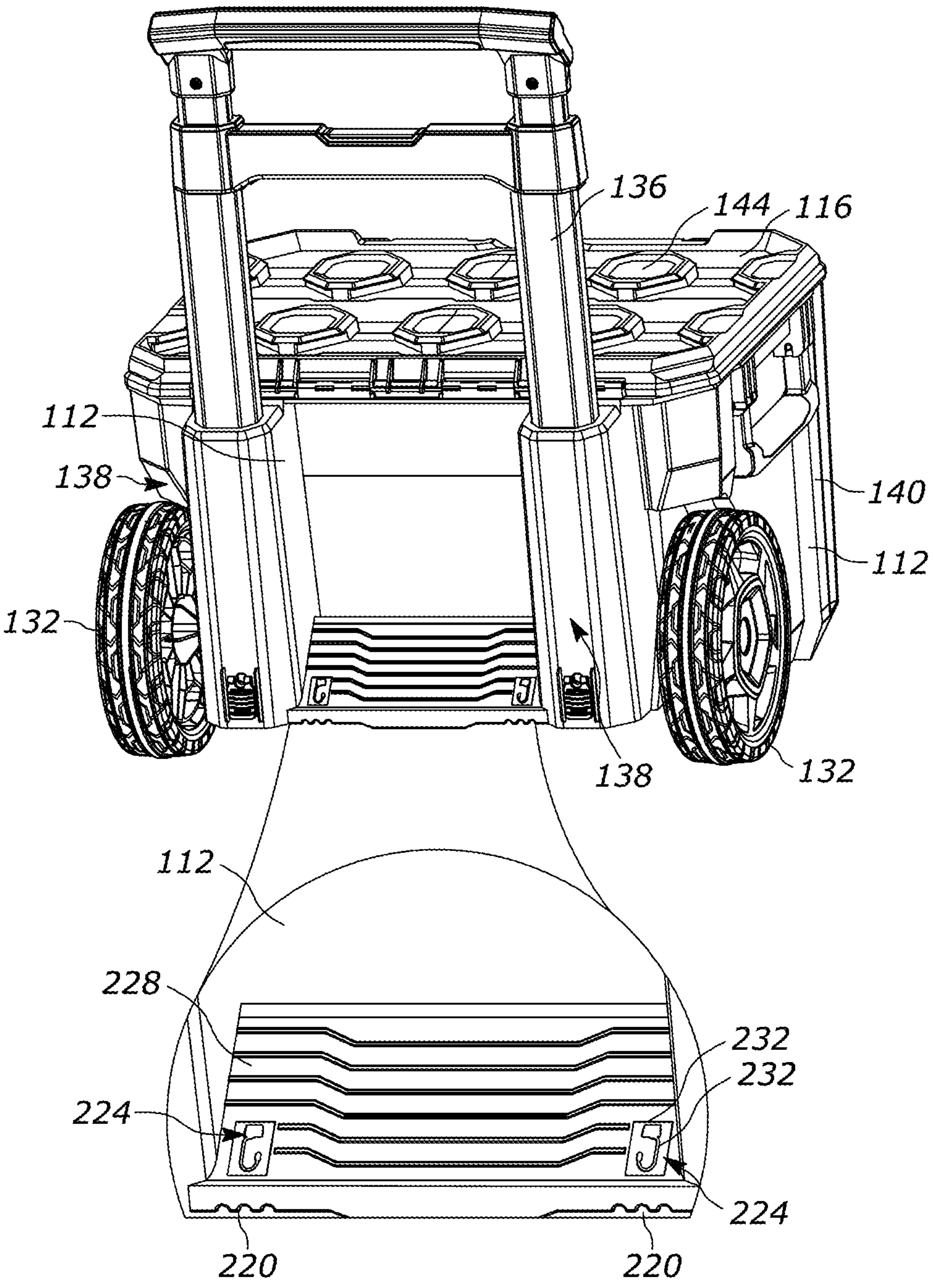
FIG. 15 is a rear perspective view of the rolling toolbox of FIG. 3 including a rear hook and a treaded foot plate.

FIGS. 14 and 15 illustrate front perspective and rear perspective views of the rolling toolbox 100, respectively. As illustrated in FIG. 14, the sidewall 112 that engages the latches 124 (i.e., a first sidewall or a "front sidewall") is further provided with hooks 220 adjacent the base 108. The sidewall 112 may further be provided with indicia 224 to indicate the location of the hooks 220. As illustrated in FIG. 15, the sidewall 112 adjacent the hinge coupling 128 (and closest to the wheels 132) (i.e., a second sidewall or a "rear sidewall") is also provided with hooks 220. The hooks 220 adjacent the rear sidewall may be further spaced apart from each other than the hooks 220 provided adjacent the front sidewall. In other embodiments, the front sidewall and the rear sidewall may be provided with a different (i.e., 1, 3, or more) number of hooks 220 which may be otherwise arranged along the sidewalls 112. With continued reference to FIG. 15, the rear sidewall 112 is further provided with indicia 224 to indicate the location of the hooks 220. Finally, with continued reference to FIG. 15, the rear sidewall 112 is further provided with a foot plate 228. The foot plate 228 is angled relative to the sidewall 112. The hooks 220 and the indicia 224 may be provided upon the foot plate 228. The foot plate 228 may optionally include treads 232. The treads 232 may be depressions extending along a length of the foot plate 228. The treads 232 may be otherwise shaped.

FIGS. 16A-27 illustrate various aspects of bins for a container storage system. As will be described below for each embodiment, the bin may be coupled to the container. The bins may be secured to the container at a variety of locations, and each bin may further be provided with features to secure the bin to another structure such as the cleat 144.

FIGS. 16A-16E illustrate a container 250 (e.g., a container that is stackable on/over a second, adjacent container 250, on/over the rolling toolbox 100, and/or the like). The container 250 may be configured to receive bins 286 therein. Similar to the container 104, 300, 304, the container 250 may include a base 258 and a plurality of sidewalls 262 extending from the base 258. The container 250 also includes a lid 266 hingedly coupled to one of the sidewalls 262 by a hinge coupling 270. A surface of the lid 266 may be provided with protrusions 274. In the illustrated embodiment, the protrusions 274 are provided on an interior surface of the lid 266 that faces the base 258 when the lid 266 is closed. The protrusions 274 are dimensioned to correspond with the sizes of the bins 286.

Figure 16A:
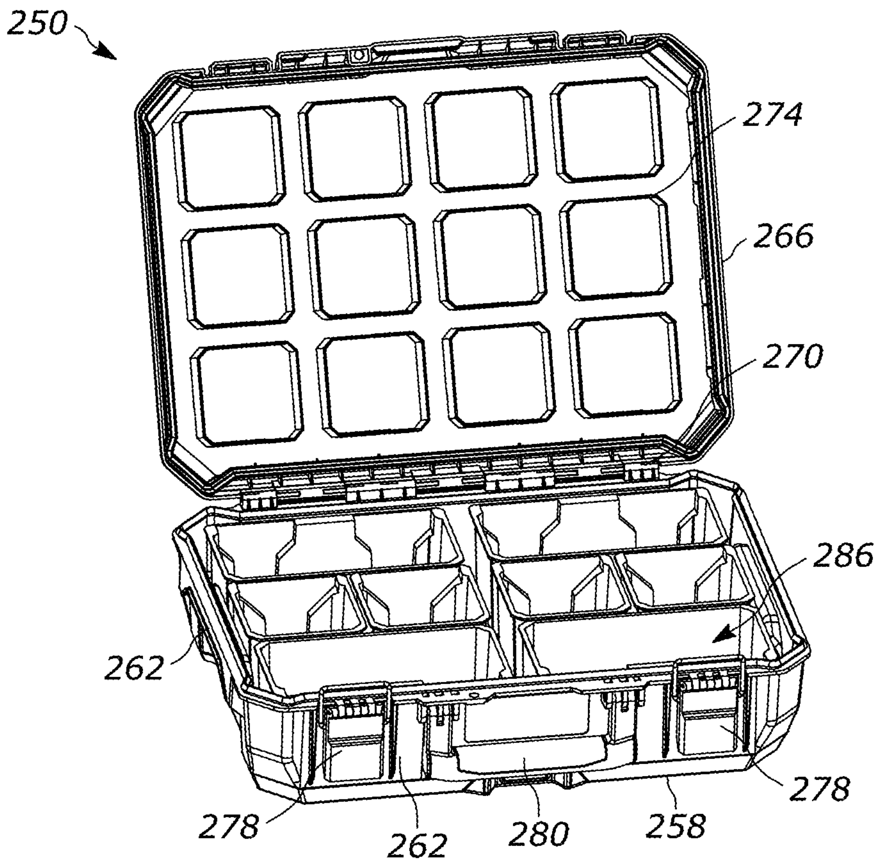
FIGS. 16A-16D are perspective views of a container including bins.
Figure 16B:
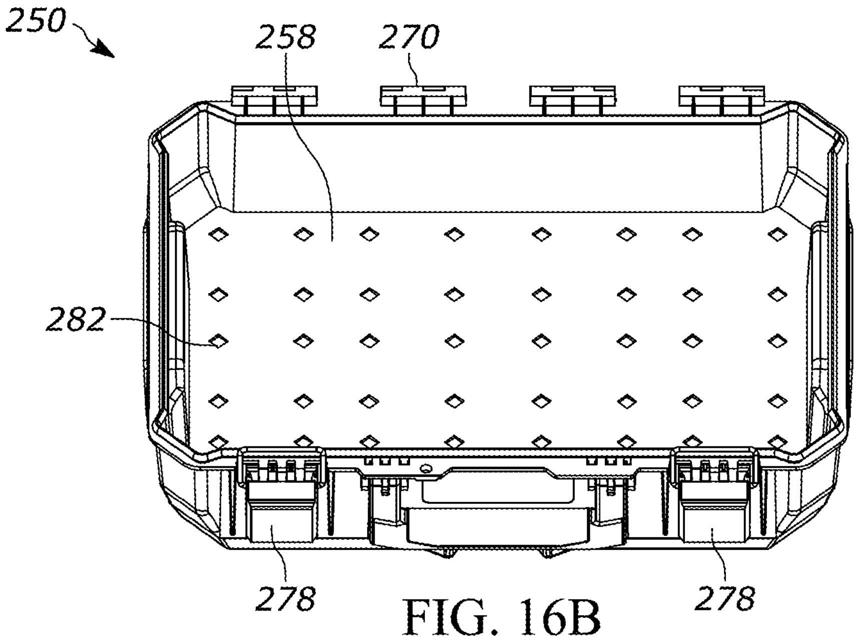
Figure 16C:
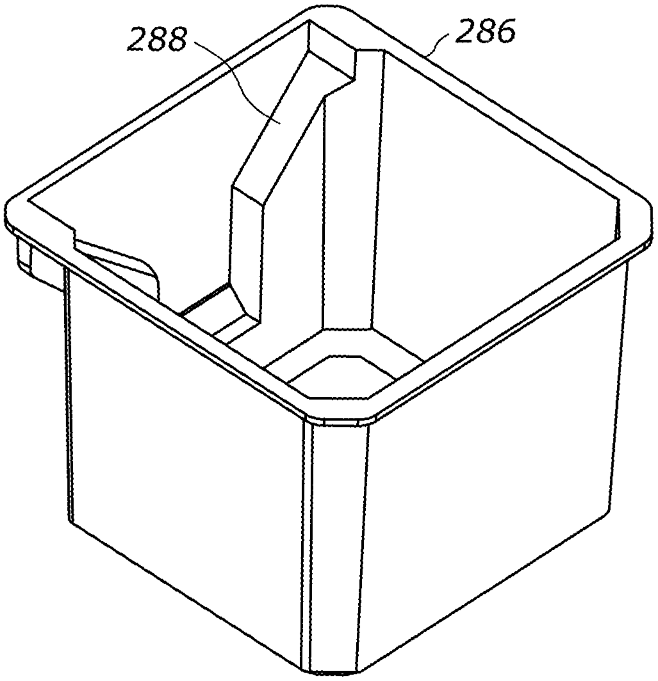
Figure 16D:
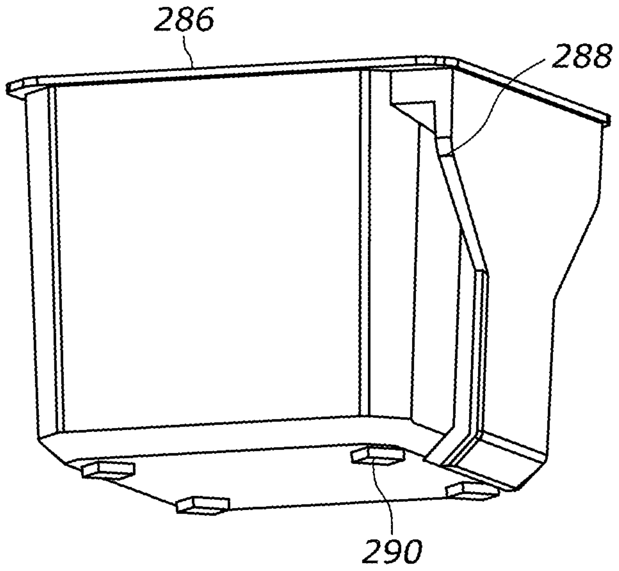
Figure 16E:
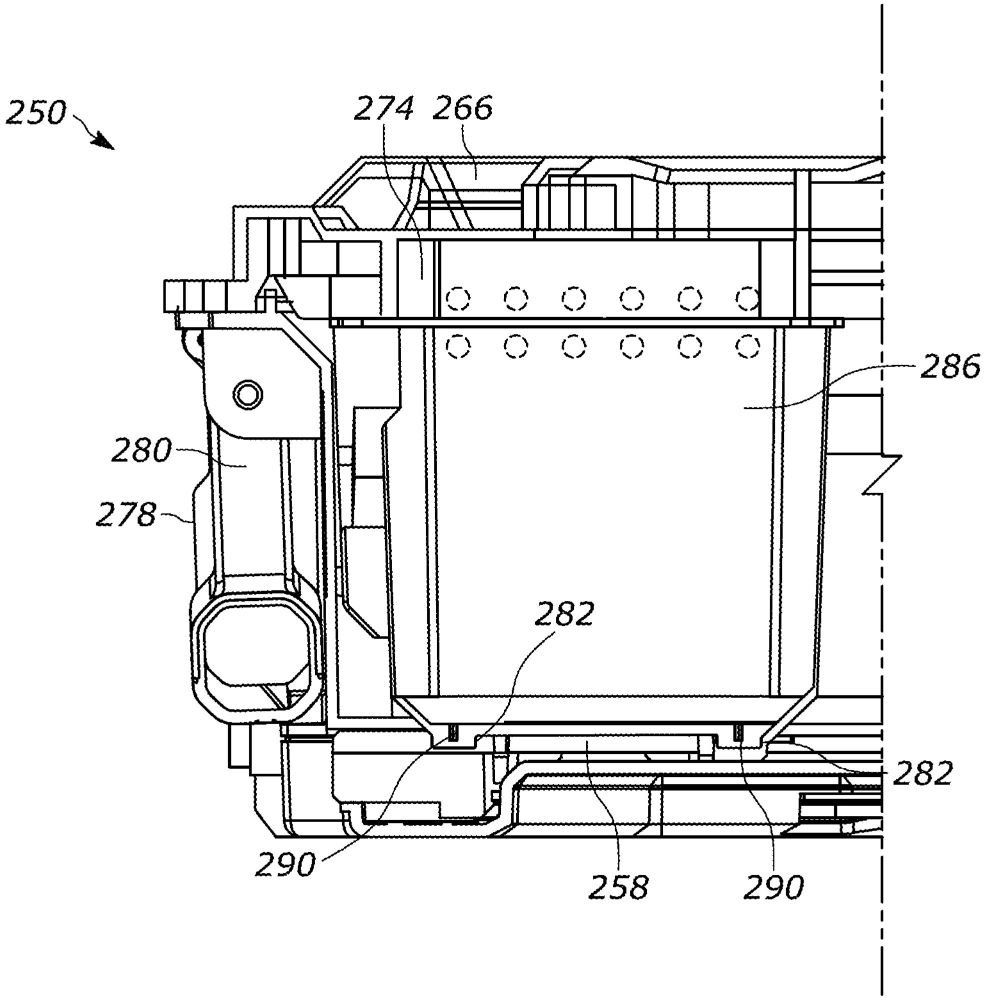
FIG. 16E is a cross-sectional view through the container and one of the bins of FIG. 16A.

As illustrated in FIG. 16E, when the lid 266 is closed, the protrusions 274 may be seated within an upper surface of an associated one of the bins 286. Accordingly, the upper edge of the bin 286 may be a mating feature configured to engage the protrusions. A first protrusion 274 may engage the upper surface of the bin 286, and that same bin 286 may be moved to engage another protrusion 274 with the bin 286 in a different position within the container 250. Optionally, an o-ring, gasket, and/or other sealing member or material (not shown) may be provided between the upper surface of the bin 286 and the protrusion 274 to seal the contents of the bin 286 from the remainder of the interior of the container 250. With reference to FIG. 16A, the container 250 may similarly include latches 278 to close the lid 266 relative to the sidewalls 262. The container 250 may include an auxiliary handle 280 similar to the auxiliary handles 140 of the containers 104, 300, 304.

As illustrated in FIG. 16B-16E, the base 258 may be further provided with a plurality of recesses 282, and the bin 286 is provided with at least one foot 290. In the illustrated embodiment, the recesses 282 are arranged in a rectangular array upon the base 258. In the illustrated embodiment, as shown in FIG. 16D, the bin 286 includes four feet 290 each provided at a corner of the bin 286. With continued reference to FIG. 16D, the bin 286 may be provided with a cleat interface 288 at an exterior surface thereof. With reference to FIG. 16C, the bin 286 may further be provided with a cleat interface 288 at an interior and/or exterior surface thereof. As illustrated in FIG. 16E, the at least one foot 290 is secured within the recesses 282 when the bin 286 is positioned within the container 250 (and optionally, when the lid 266 is closed). In the illustrated embodiment, the rectangular array includes longitudinal and lateral spacing between each of the recesses 282 such that each of the four feet 290 corresponding to the four corners of the bin 286 may be received within one of the recesses 282. Optionally, the recesses 282 may be dimensioned marginally smaller than the feet 290 such that the feet 290 are press-fit into the recesses 282. As illustrated in FIG. 16A, the bins 286 may have different sizes. Some of the bins 286 may have a width that is twice as wide as other bins 286.

Figure 17:
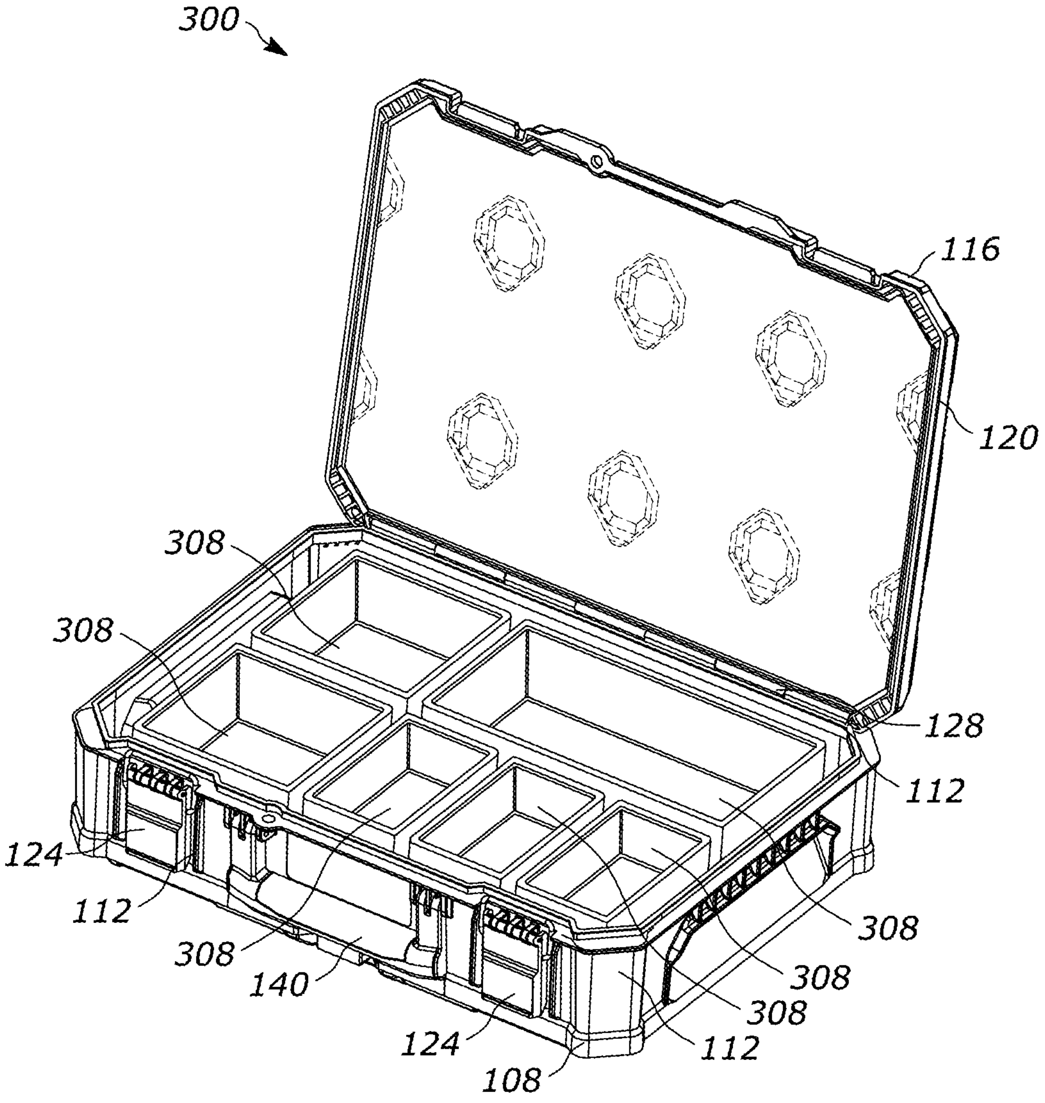
FIG. 17 is a perspective view of a container in an open position with multiple bins provided therein.

FIG. 17 illustrates the internal compartment of container 300. The container 300 includes like features of the container 104. The container 300 may be dimensioned to secure many variously sized bins 308 therein.

Figure 18A:
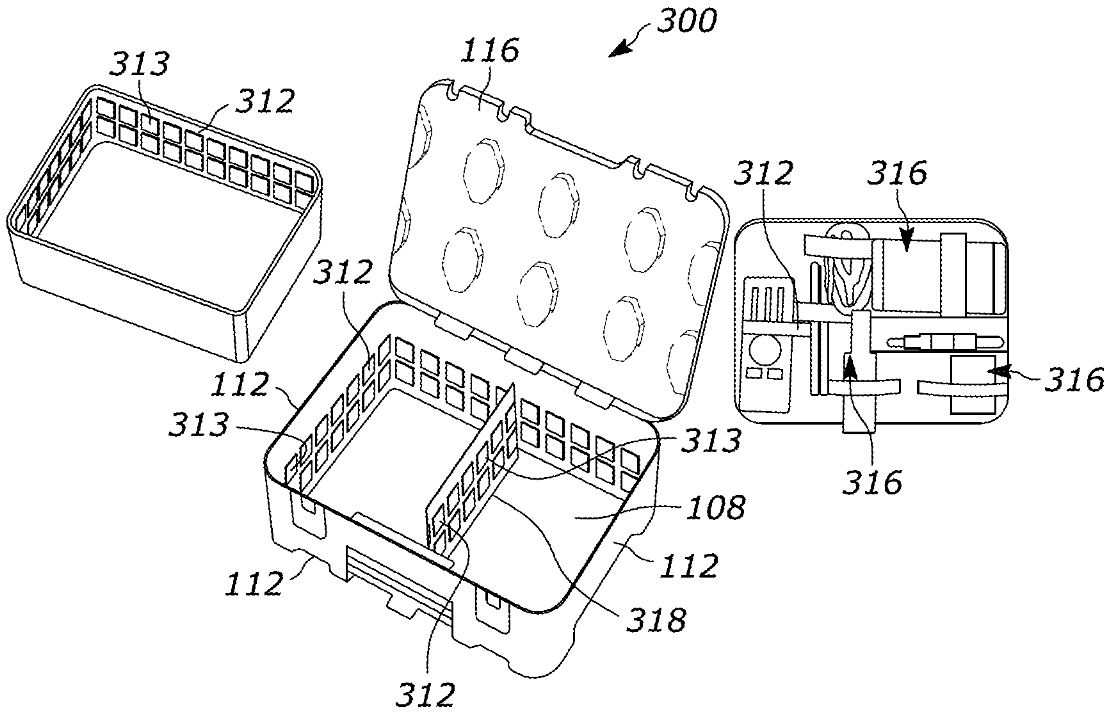
FIG. 18A is another perspective view of a container in an open position with an elastic loop mechanism provided therein.

FIGS. 18A-18D illustrate different uses of the container 300. As illustrated in FIG. 18A, the sidewalls 112 of the container 300 may be provided with an elastic band structure 312. The elastic band structure 312 is configured to deflect (i.e., the elastic band structure 312 is expandable) to secure (i.e., receive) an item 316 between the elastic band structure 312 and at least one of the base 108, the sidewall 112, or the lid 116 for retaining the item 316. The elastic band structure 312 may also be provided on a divider wall 318. The elastic band structure 312 is coupled to at least one of the base 108, the sidewall 112, the lid 116, or the divider wall 318. The elastic band structure 312 may be coupled to the at least one of the base 108, the sidewall 112, the lid 116, or the divider wall 318, for example, by being stitched to an inner surface thereof, being retained via ridges, lips, grooves, or other mechanical retainers, or by being glued to the interior surface thereof. In some embodiments, the elastic band structure 312 may be coupled to an intermediate surface which is coupled to the at least one of the base 108, the sidewall 112, the lid 116, or the divider wall 318. Other mechanisms may couple the elastic band structure 312 to at least one of the sidewall 112, the lid 116, or the divider wall 318. The divider wall 318 may be configured to be attached within the interior of the container 300. In the illustrated embodiment, the divider wall 318 extends in a direction extending away from the base 108 and generally parallel to two of the sidewalls 112. The elastic band structure 312 may be an array of elastic straps 313 (e.g., a MOLLE loop array). In some embodiments, the array of elastic straps 313 includes variable strap width between each of the elastic straps 313. In some embodiments, the array of elastic straps 313 includes a variable weave pattern between each of the elastic straps 313. The elastic band structure 312 (and/or array of elastic straps 313) may be provided with at least one traction element (not shown) provided on a surface thereof, the traction element having a different coefficient of friction than the elastic band such that an amount of contact friction between the item 316 and the traction element is enhanced. In some embodiments, the traction element may be a rubber traction dot provided on an exterior surface of at least one of the elastic straps 313 of the elastic band structure 312. The traction dot may not necessarily enclose the entirety of the elastic strap 313 therein. However, the traction dot may weave in and out of the elastic strap 313 intermittently. Other such traction elements are possible.

Figure 18B:
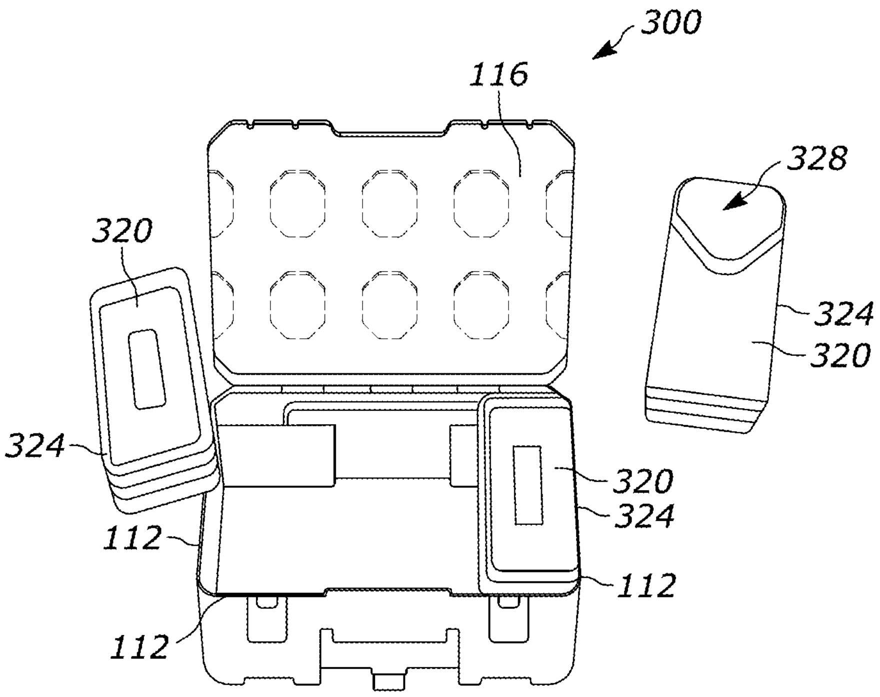
FIG. 18B is a perspective view of a container in an open position with multiple quarter length bins provided therein.
Figure 18C:
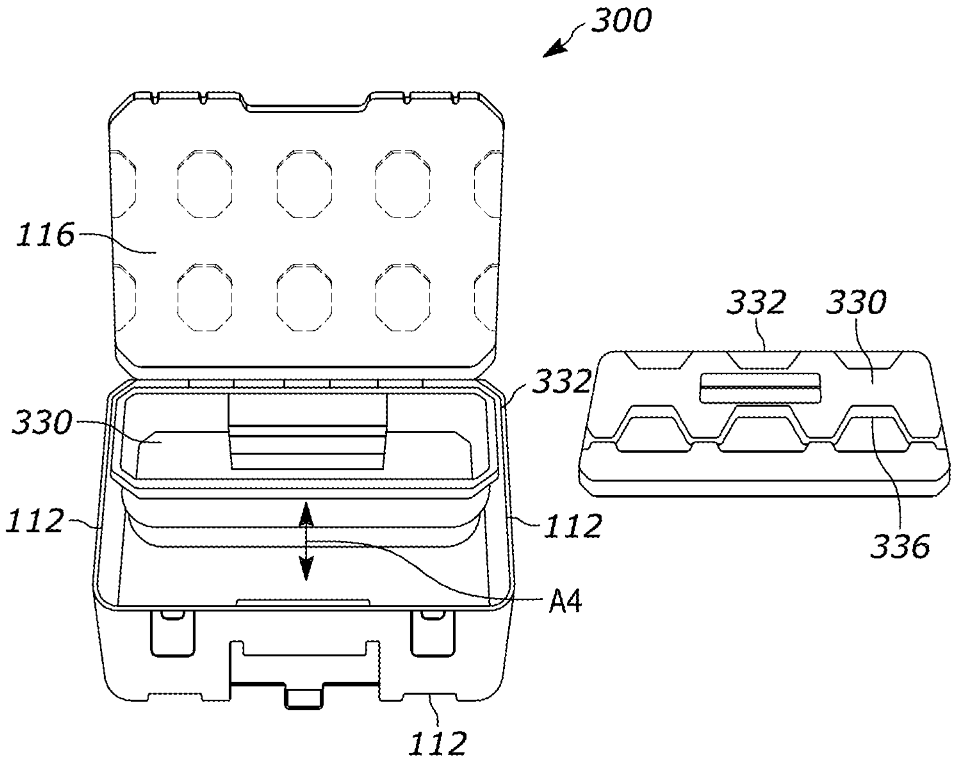
FIG. 18C is a perspective view of a container in an open position with multiple third width bins provided therein.
Figure 18D:
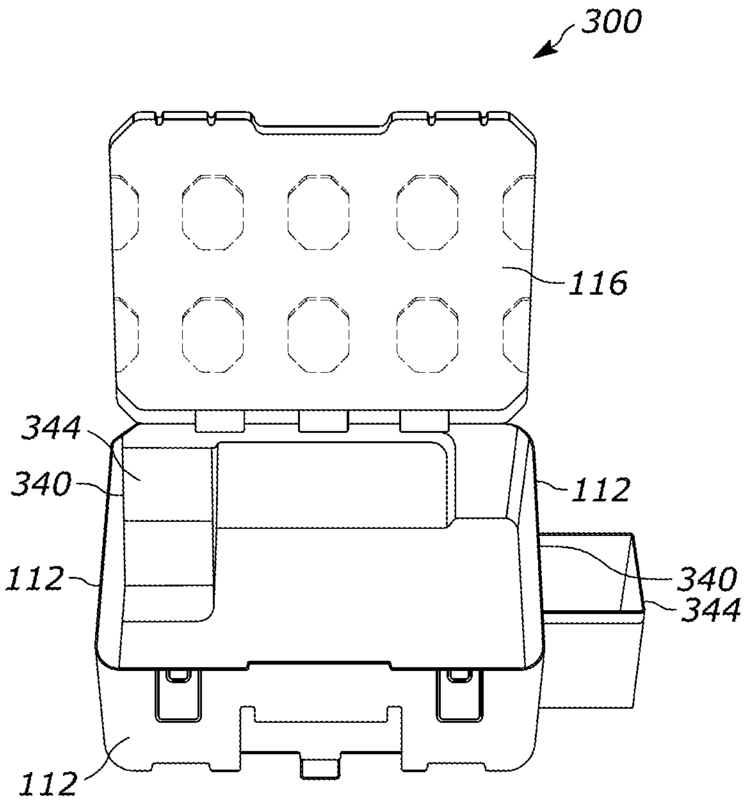
FIG. 18D is a perspective view of a container in an open position with bins supported on a peripheral edge of a sidewall within and along the exterior of a container.
Figure 24:
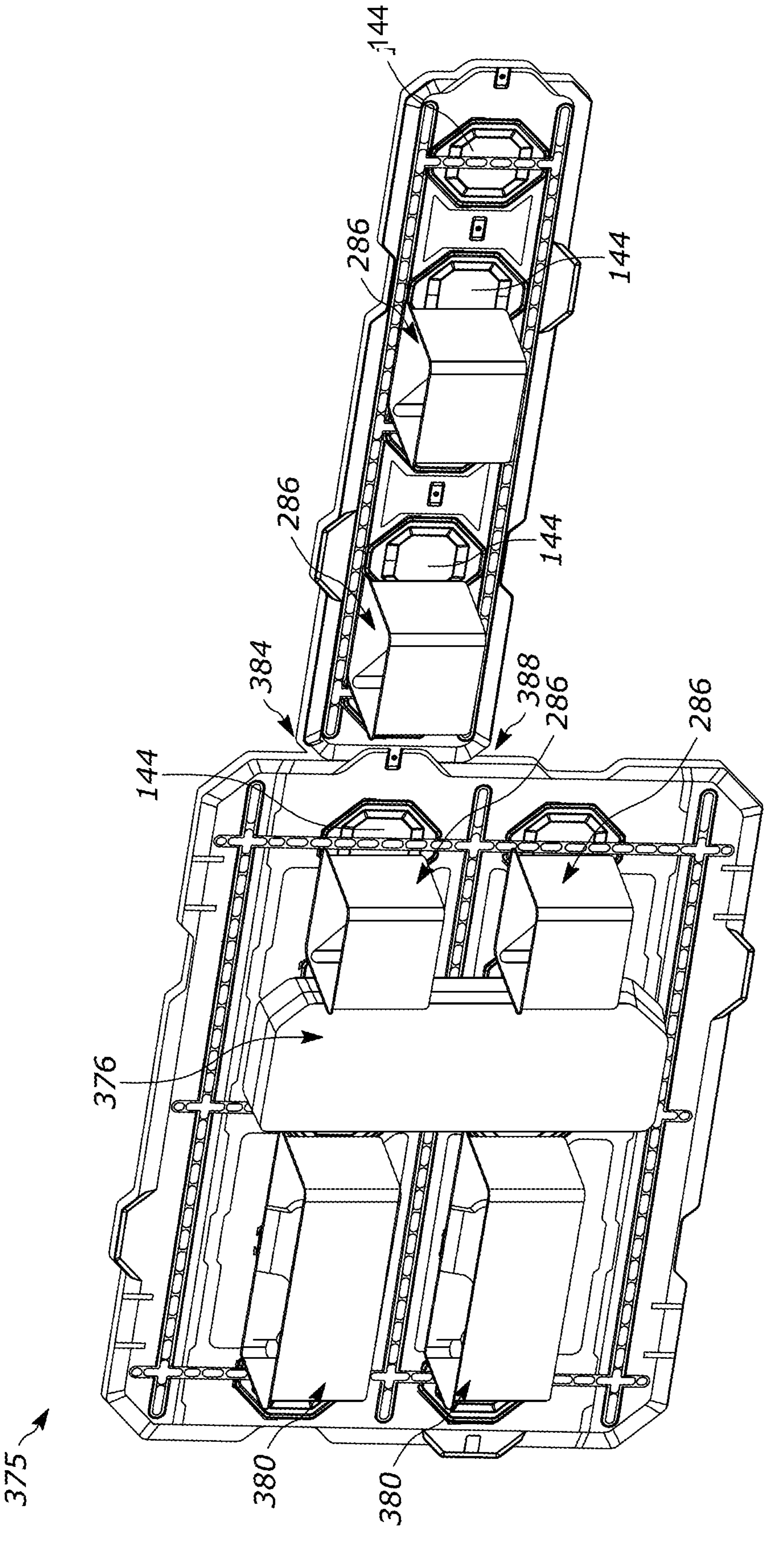
FIG. 24 is a perspective view of the bins of FIG. 23 supported on a wall storage system.
Figure 25B:
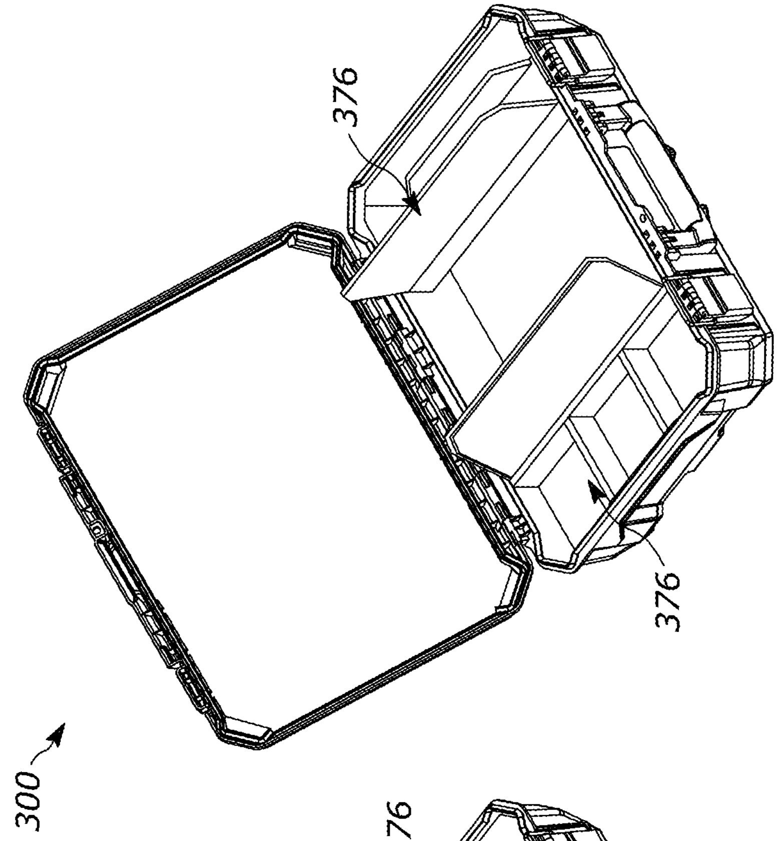
FIGS. 25A-25E are perspective view of various configurations of bins provided within a container.
Figure 25A:
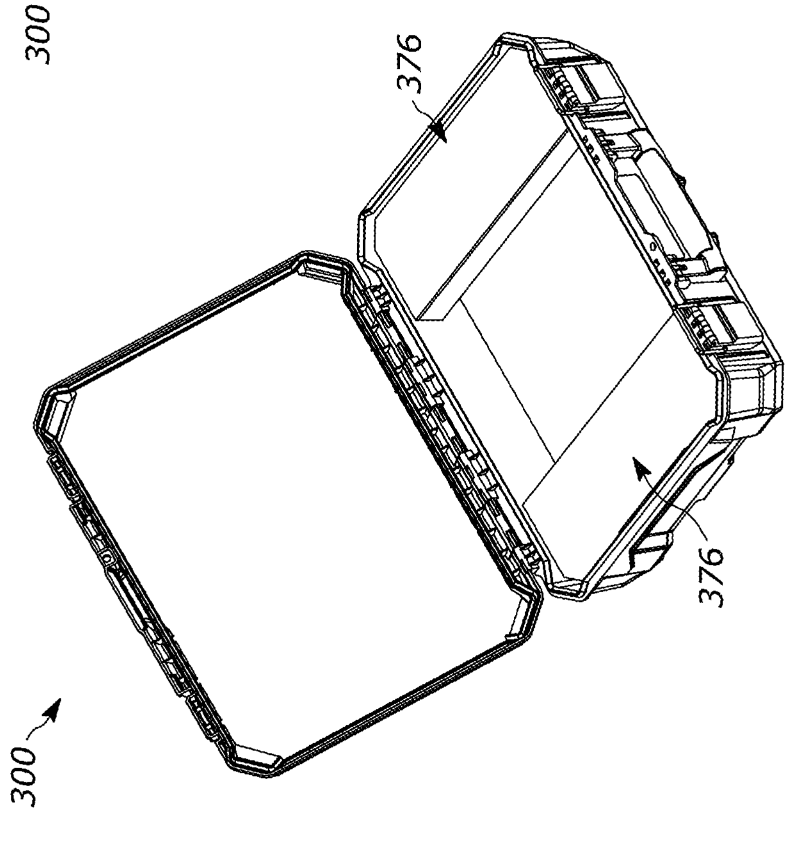
Figure 25D:
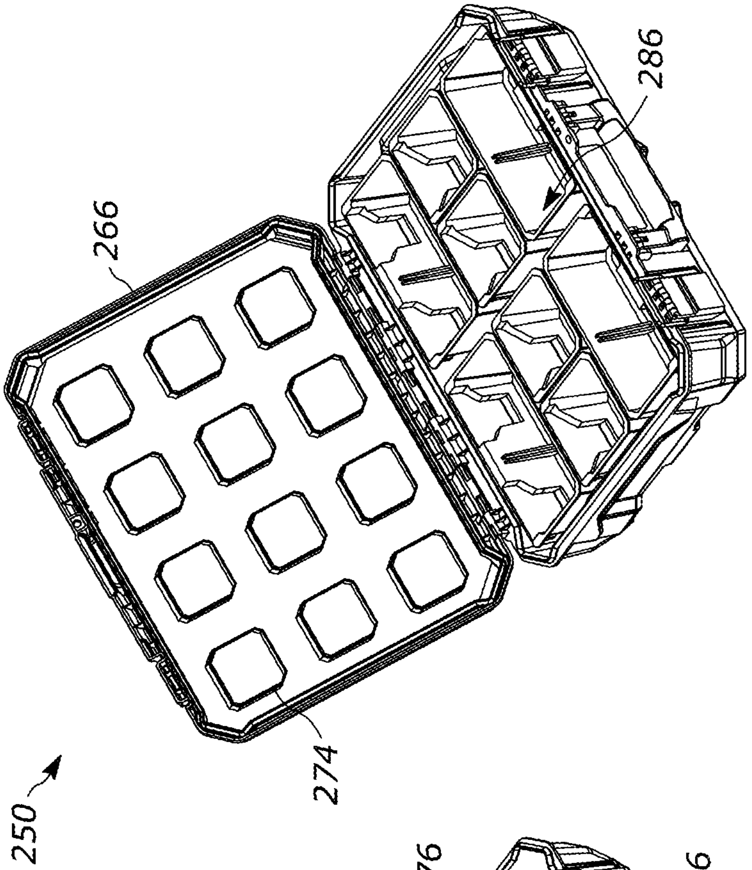
Figure 25C:
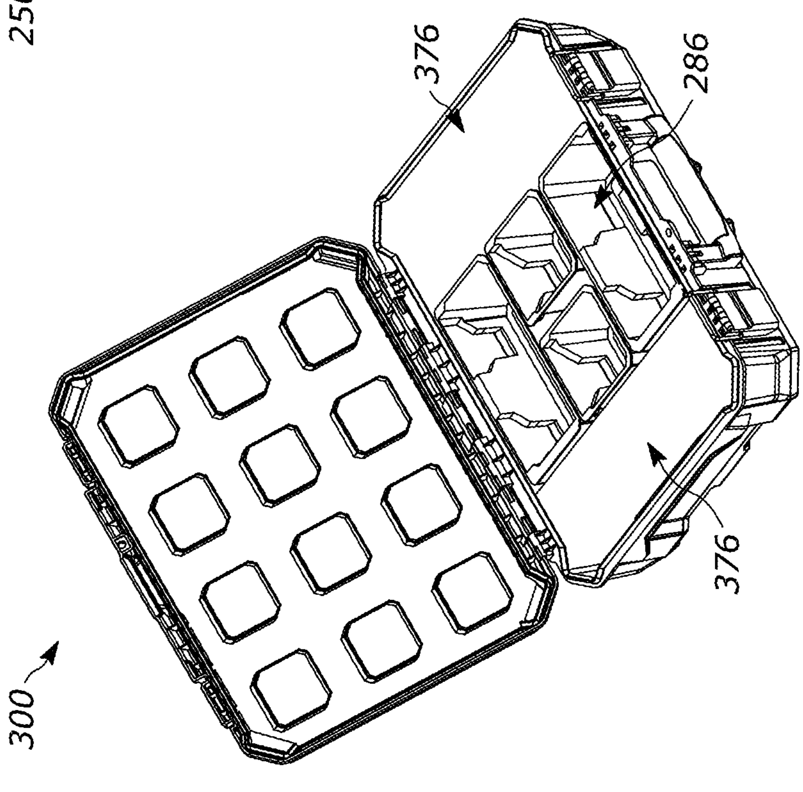
Figure 25E:
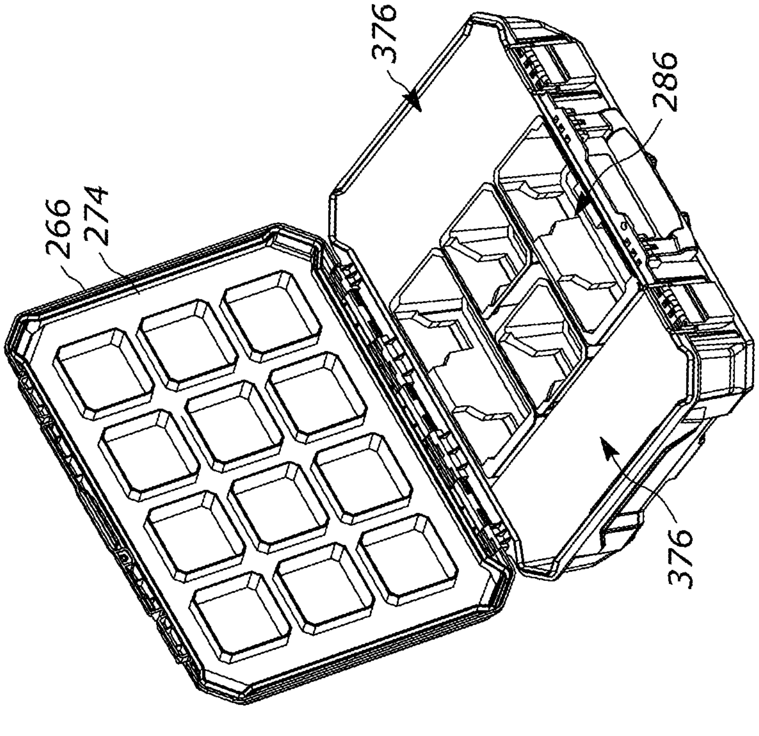

FIG. 18B illustrates another bin 320 configured for use with the container 300. The bin 320 includes a hook 324 provided at a peripheral wall thereof. The hook 320 is configured to engage a top surface of the sidewall 112 with at least a portion of the bin 320 being received within the container 300. The bin 320 may further be provided with a cleat interface 328 which may engage the cleat 144 in a similar fashion to the cleat interfaces 288 of the bin 286 (FIGS. 16C, 16D, 24). A bin 330 illustrated in FIG. 18C also has a periphery with a hook 332. Additionally, the bin 330 also has a cleat interface 336. The bin 330 may be an accessory tray configured to slide in a direction parallel to arrow A4 with the hook 332 while being supported upon the sidewalls 112 between various positions (i.e., along the sidewalls 112 between a first position and a second position). Finally, FIG. 18D illustrates accessory bins 344 with hooks 340 which function similar to the hooks 324 and the hooks 332. The accessory bins 344 may be positioned with the hooks 340 engaging the sidewalls 112 and with at least a portion of the accessory bin 344 within the interior of the container 300. Alternatively, the accessory bins 344 may be positioned with the hooks 340 engaging the sidewalls 112 and with at least a portion of the accessory bin 344 being exterior to the bin 300. In each of these embodiments, the hooks 324, 332, 344 may be configured as a “mating feature,” and an upper portion of the sidewall 112 may be configured as a “connection feature.” The upper portion of the sidewall 112 includes the entire perimeter of the sidewalls 112, as the hooks 324, 332, 344 can engage each of the sidewalls 112 equally.

Figure 19:
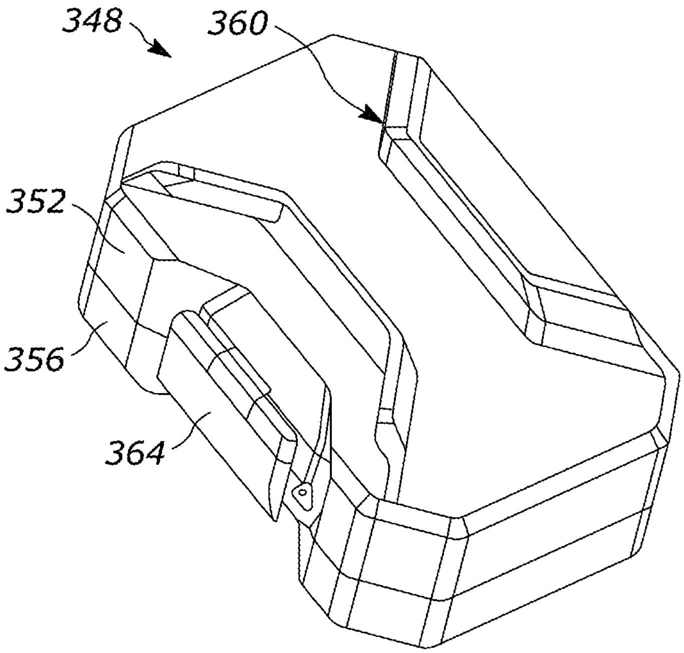
FIG. 19 is a perspective view of a bit container configured to engage a container.
Figure 19A:
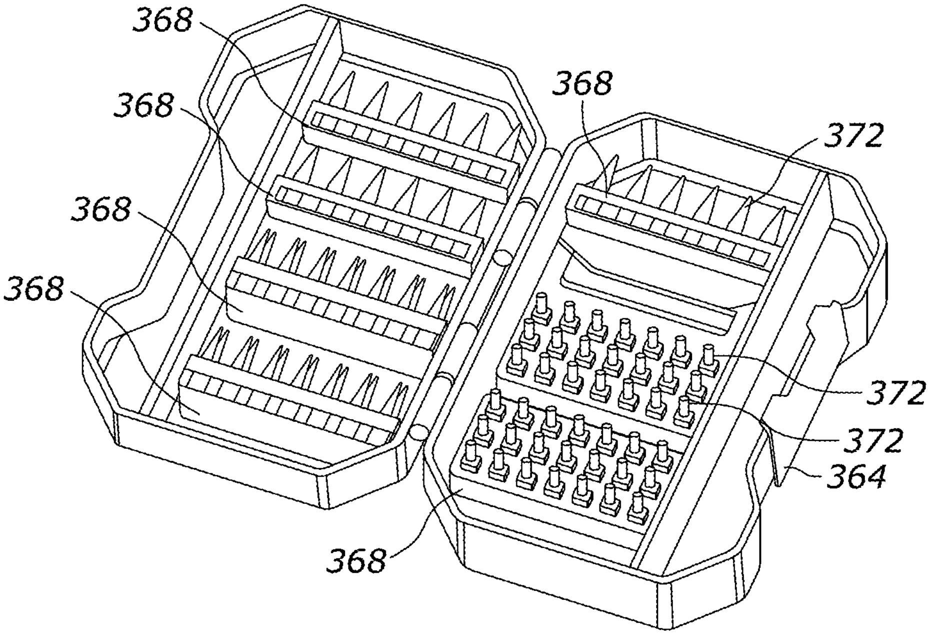
FIG. 19A is a perspective view of the bit container of FIG. 19 in an open position.
Figure 19B:
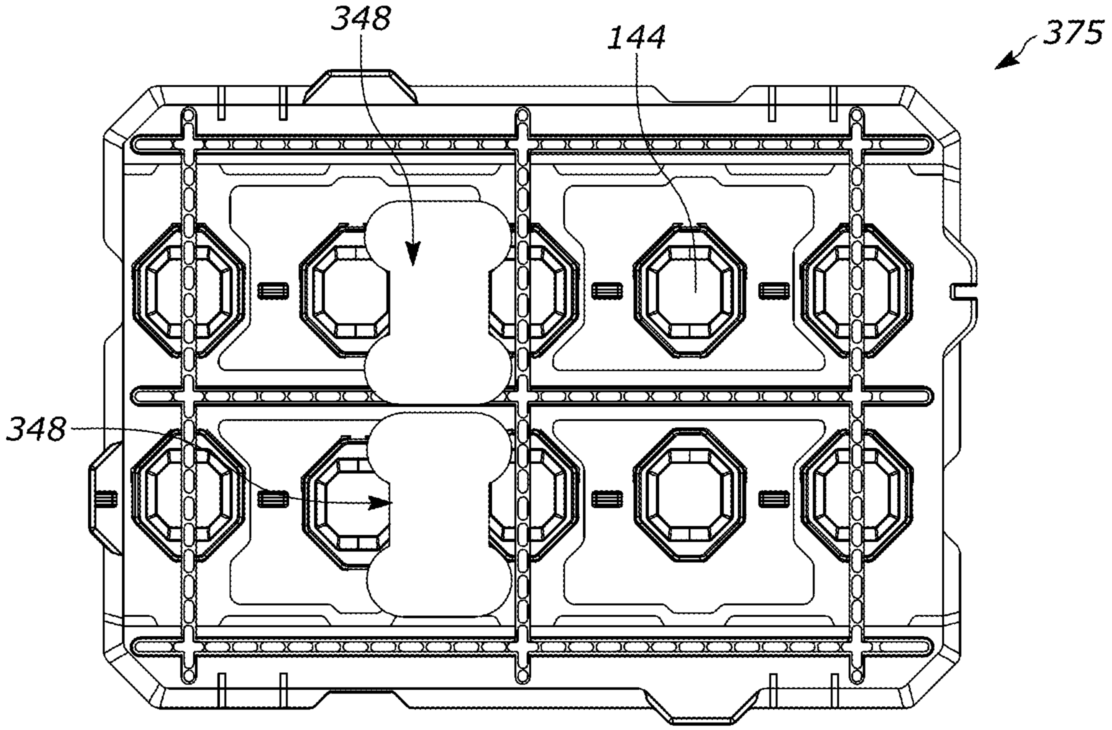
FIG. 19B is a front view of the bit container of FIG. 19 engaged with a wall storage system.
Figure 19C:
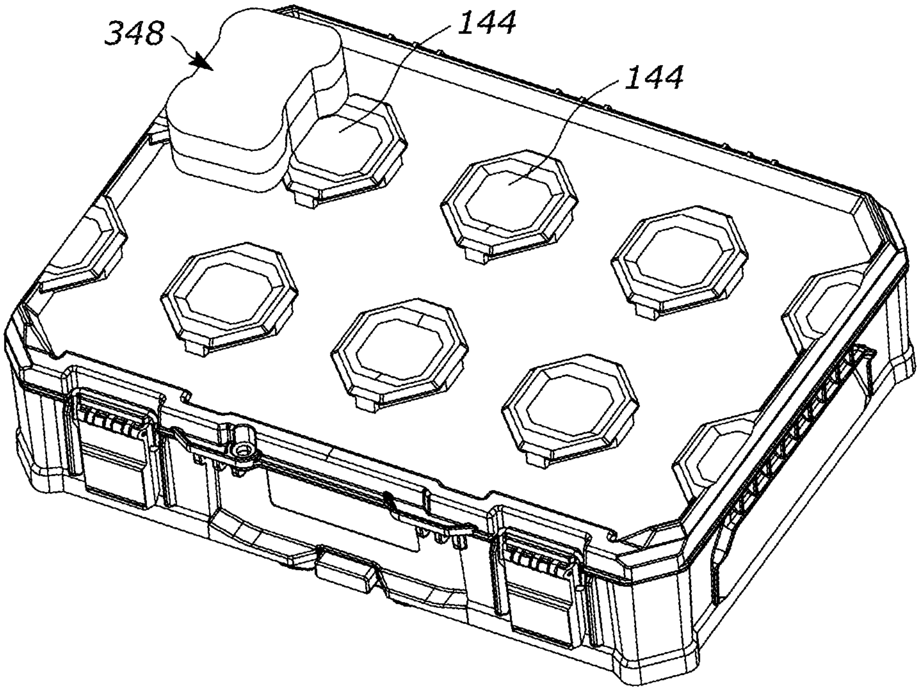
FIG. 19C is a perspective view of the bit container of FIG. 19 engaged on the exterior of a container.
Figure 19D:
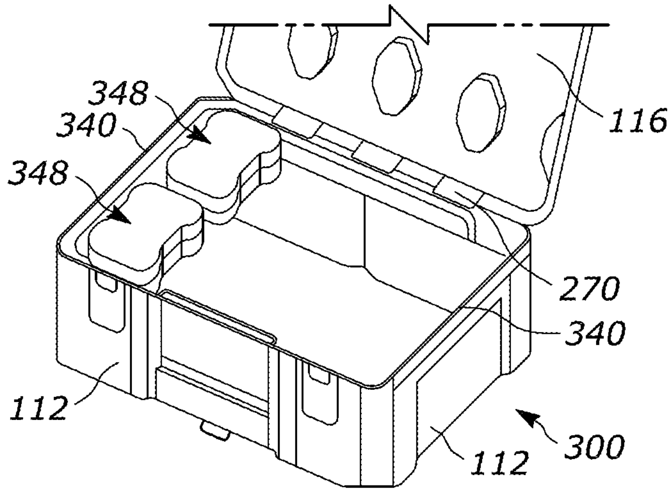
FIG. 19D is a perspective view of the bit container of FIG. 19 engaged in the interior of a container.

FIG. 19 and FIGS. 19A-19D illustrate a bin 348 in the form of a bit holder 348. As illustrated in FIG. 19, the bit holder 348 includes a first clamshell housing 352 and an opposing second clamshell housing 356. At least one of the clamshell housings 352, 356 (as illustrated in FIG. 19, the clamshell housing 352) is provided with a cleat interface 360 dimensioned to engage the cleat 144. The bit holder 348 further includes a latch 364 to hold the clamshell housings 352, 356 in a closed position (FIG. 19). FIG. 19A illustrates the bit holder 348 in an open position. The bit holder 348 may receive, within the clamshell housings 352, 356, a bit receiver 368. In the illustrated embodiment, the bit holder 348 receives a plurality of bit receivers 368. Each bit receiver 368 may receive a plurality of bits 372 therein for storage within the bit holder 348. As illustrated in FIG. 19B, the bit holder 348 may engage at least one cleat 144 of a wall panel 375. The wall panel 375 includes a plurality of cleats 144 arranged thereon. The cleats 144 may be spaced on the wall panel 375 in a rectangular array. Similarly, as illustrated in FIG. 19C, the bit holder 348 may engage cleats 144 provided on an exterior surface of the lid 166. Additionally, as illustrated in FIG. 19D, the cleat interface 360 may be configured to mount the bit holder 348 within the container 300 with the cleat interface 360 functioning as the aforementioned hooks 324, 332, 344 which engage a top surface of the sidewalls 112.

Figure 20:
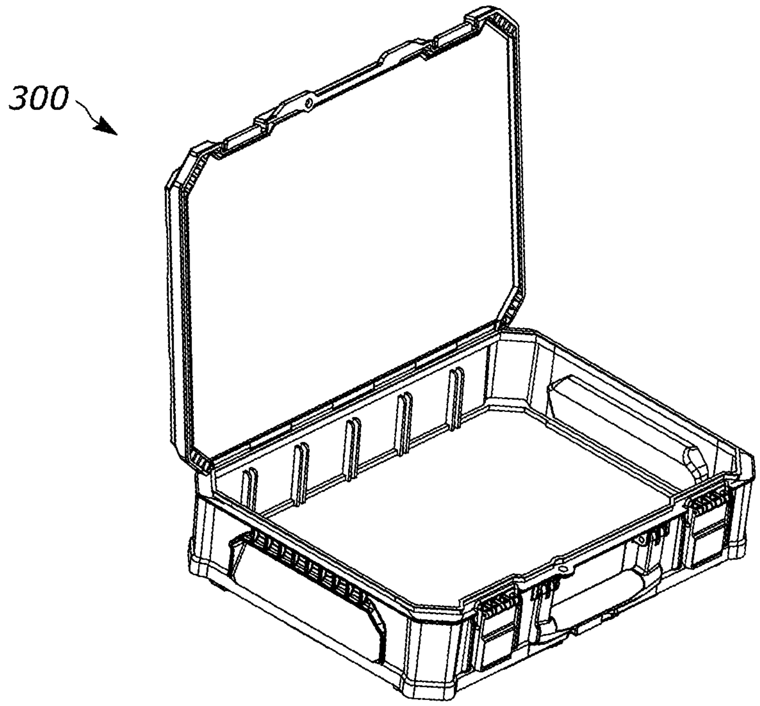
FIG. 20 is another perspective view of a container in the open position.
Figure 21:
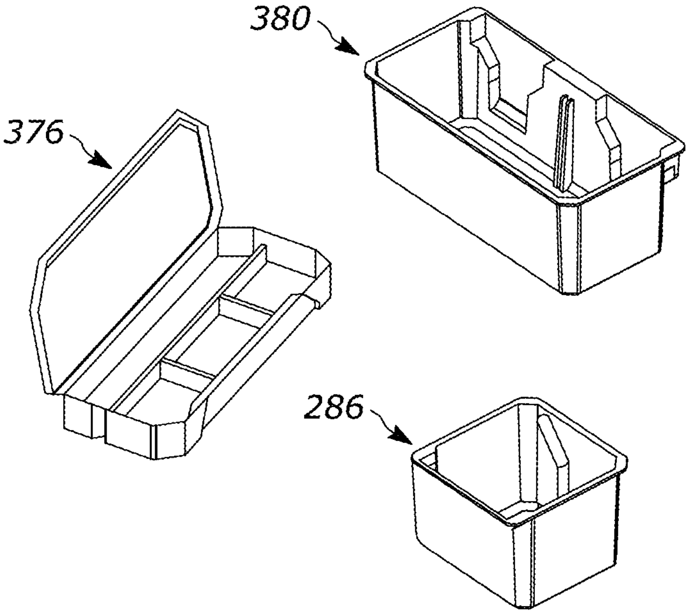
FIG. 21 is a perspective view of bins configured for storage within the container of FIG. 20.
Figure 22:
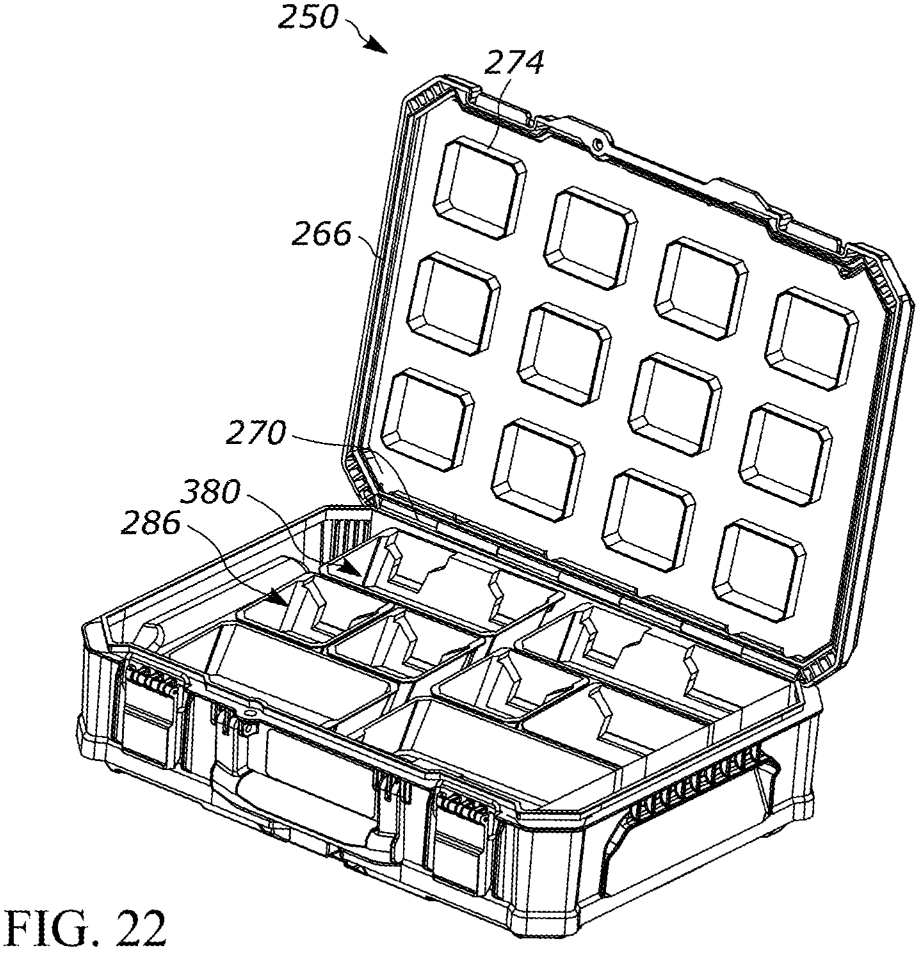
FIG. 22 is a perspective view of the bins of FIG. 21 positioned within a container.

FIGS. 20-21 illustrate additional arrangements of the containers 300, 250. In FIG. 20, the container 300 is illustrated without any bins 286. FIG. 21 illustrates the bin 286, a bin 380 which is generally dimensioned with twice the length as the bin 286, and a small parts organizer 376. FIG. 22 illustrates the container 250 with the protrusions 274 and housing a plurality of the bins 286, 380 therein. The bin 380 and the small parts organizer 376 may be provided with cleat interfaces 288 similar to the bin 286. The small parts organizer 376 may include a hinged lid which can be closed.

Figure 23:
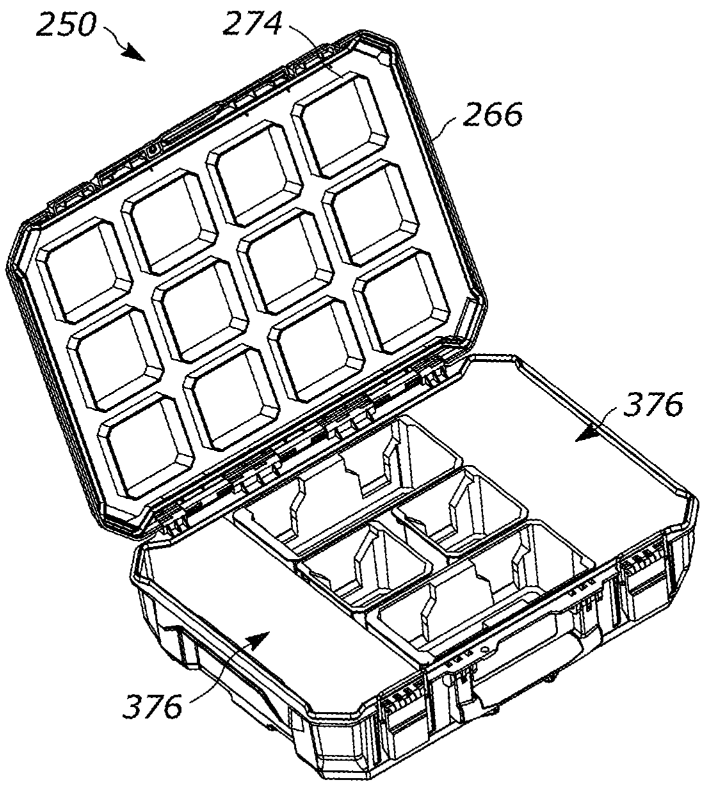
FIG. 23 is another perspective view of the container of FIG. 22 including bins therein.

FIG. 23 illustrates the small parts organizer 376 provided within the container 250. FIG. 24 illustrates the bin 286, the bins 380, and the small parts organizer 376 mounted upon a wall panel 375 and a rail 384. The wall panel 375 and the rail 384 each include cleats 144 which are spaced from each other. The rail 384 engages the wall panel 375 at an interface 388. The interface may include a male-female connection in which the wall panel 375 is mated to the rail 384 such that the cleats 144 of the wall panel 375 and the rail 384 are evenly spaced from each other such that the cleat interface 288 of the bin 388 may span both the wall panel 375 and the rail 386.

FIGS. 25A-25E illustrate alternate embodiments of the bins 286, 380 and the small parts organizer 376 as provided within the containers 250, 300.

Figure 27:
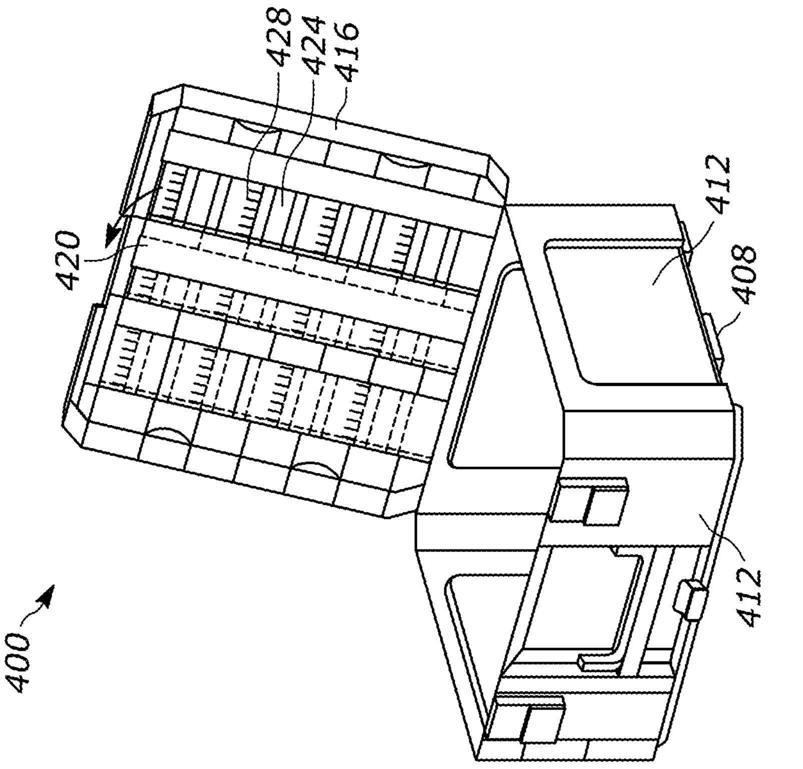
FIG. 27 is a perspective view of the container of FIG. 26 with the locking bit bar in an open position.
Figure 26:
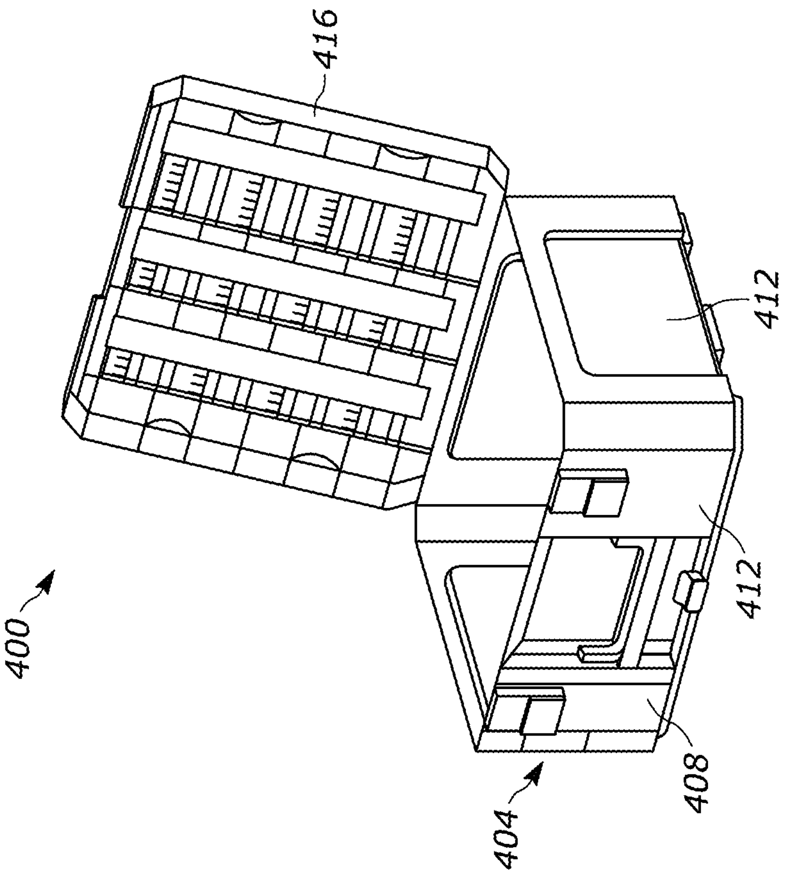
FIG. 26 is a perspective view of a container provided with a lid having a locking bit bar in a closed position.

FIGS. 26-27 illustrate another container 400. The container 400 is provided with like features to the container 104 with reference numbers in the “400” series. However, the container 400 is provided with the lid 416 having a hinged door 420 which reveals at least one bit holder 424. The bit holder 424 is configured to receive a plurality of bits 428 therein.

The embodiments described above with respect to FIGS. 16A-27, a hierarchy of storage containers is provided. First, the rolling toolbox 100 may include a plurality of containers (e.g., the containers 104, 300, 304, 250, 400). At least one of the containers 104, 300, 304, 250, 400 includes a wheel 132 for rolling the rolling toolbox 100 between the storage location and the work space. Second, each of the containers 104, 300, 304, 250, 400 may be provided with at least one bin therein. In the embodiments illustrated above, the bin may be, for example, the bins 286, 308, 320, 330, 348, 380, the elastic band structure 312, the small parts organizer 376, and the lid 416 function as a bin to retain an item to and/or within at least one of the containers 104, 300, 304, 250, 400. In the case of the lid 416, as described above, the bit holder 424 is provided on the lid 416 with the lid 416 and door 420 functioning as a bin. Each of the bins may be reconfigured or otherwise dimensioned to engage any of the described bins. The hierarchy may be extended further to include other bins smaller than the described bins, and/or other tool storage systems other than the rolling toolbox 100 (e.g., the wall panel 375, rail 384).

Figure 28:
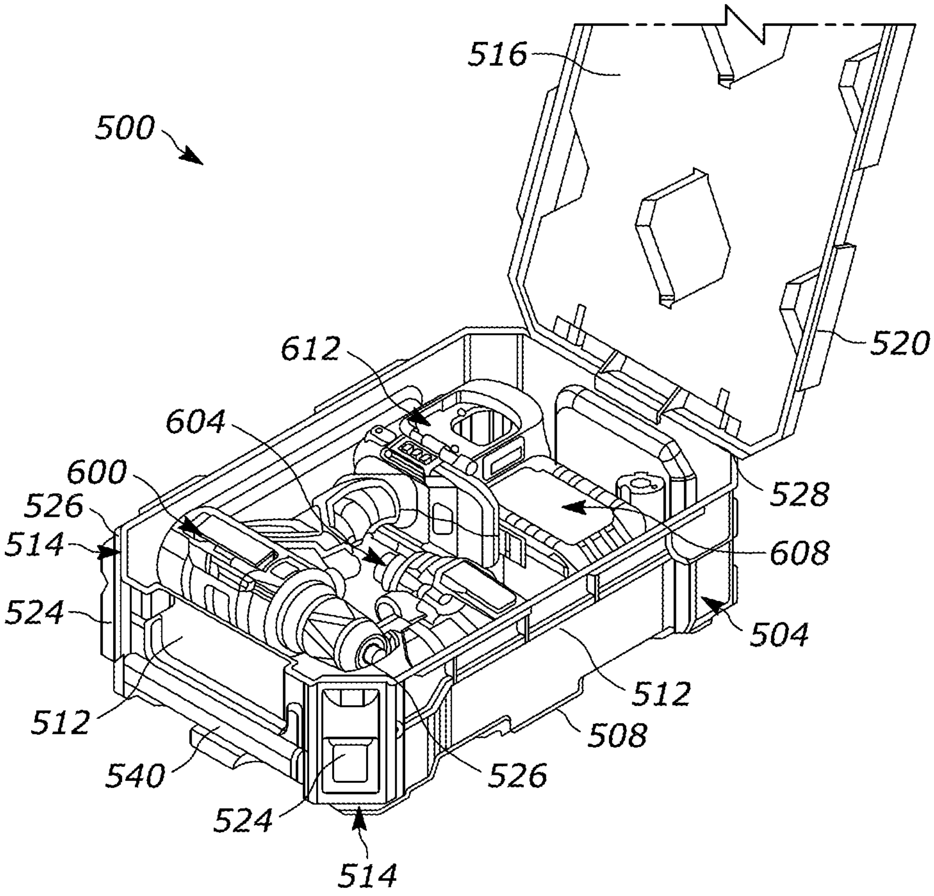
FIG. 28 is a perspective view of a container according to another embodiment and in an open position.
Figure 29:
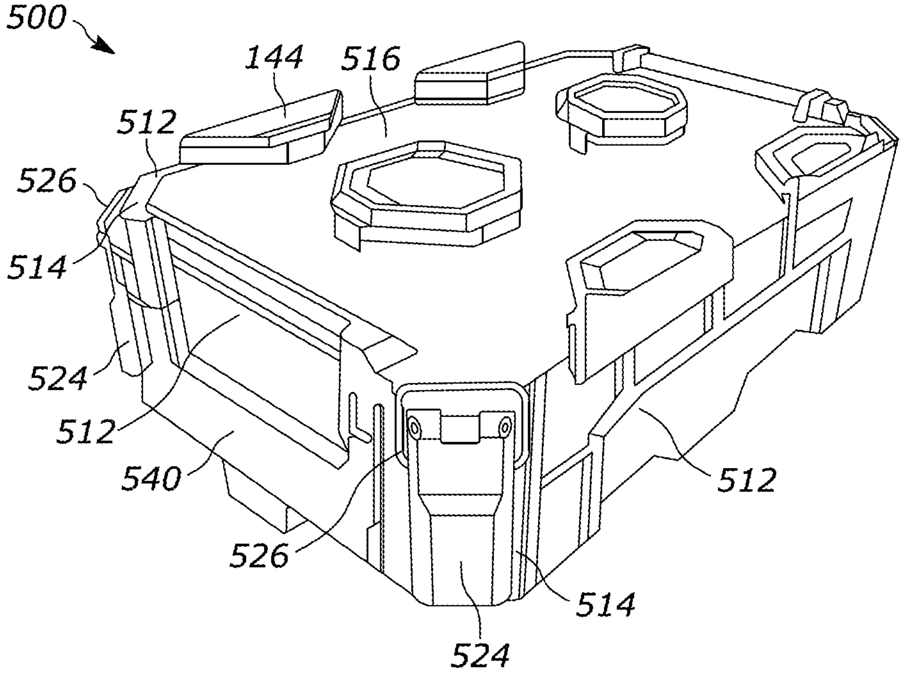
FIG. 29 is a perspective view of the container of FIG. 28 in a closed position.
Figure 30:
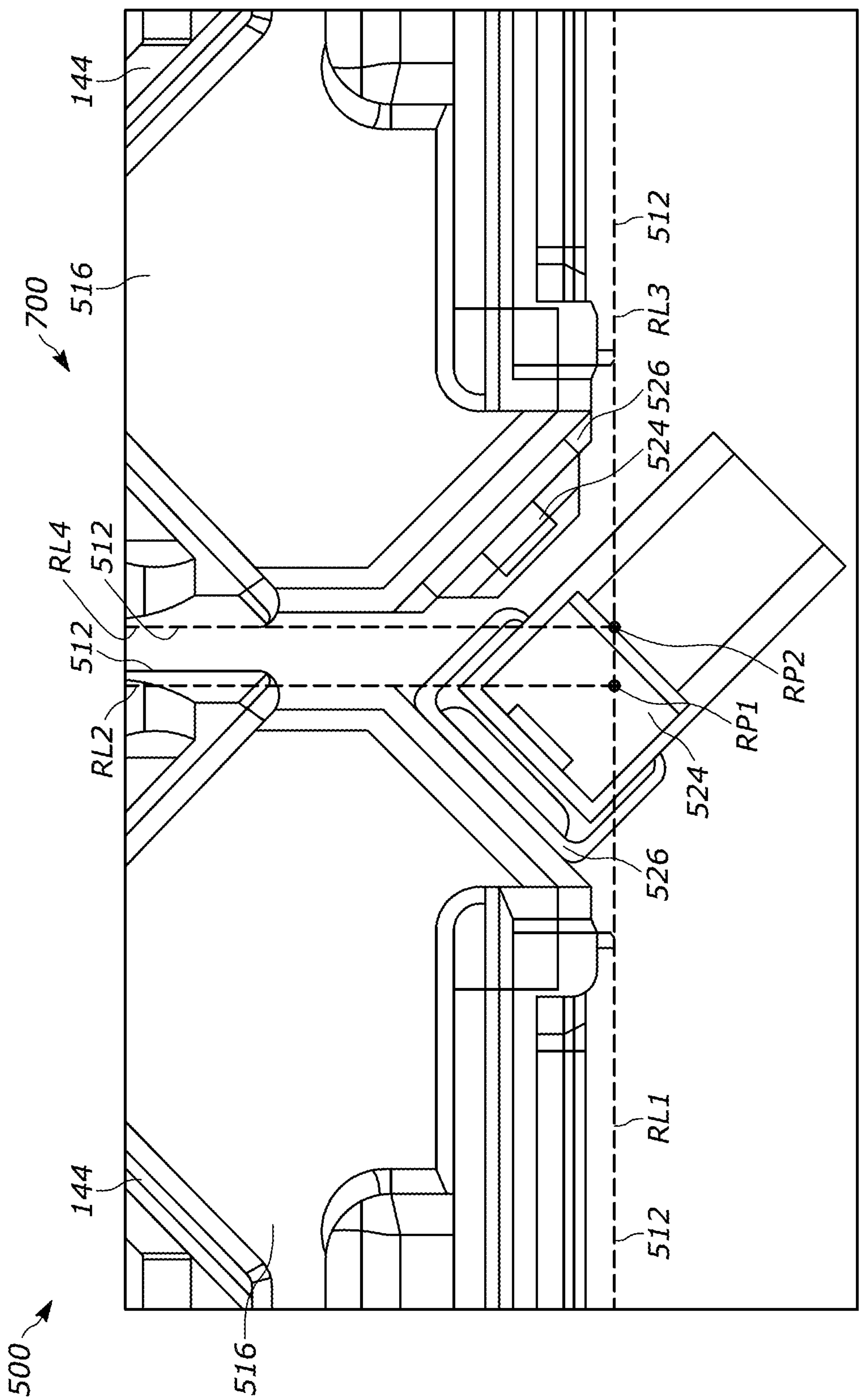
FIG. 30 is a top view of the container of FIG. 28 adjacent another container of FIG. 28 and with a toggle latch of one of the containers in an unlocked position.

FIGS. 28-30 illustrate a container 500 which is generally dimensioned with half the width as the containers 104, 300, 304. Accordingly, in the rolling toolbox 100 (FIG. 1), the container 500 and another similarly dimensioned container 500 can be supported side-by-side by one other of the containers 104, 300, 304. The container 500 includes a base 508 and a plurality of sidewalls 512 extending from the base 508. A base 508 of the container 500 and a base 500 of an adjacent container 700 of similar geometry to the container 500 (FIG. 30) may be dimensioned to engage one of the containers 104, 300, 304. Accordingly, the bases 508 of the containers 500, 700 are dimensioned with a "combined base" configured to engage one of the other containers 104, 300, 304 which supports both the container 500 and the container 700. Each sidewall is in contact with an adjacent sidewall 512 at a corner 514. The container 500 includes a lid 516 hingedly coupled to one of the sidewalls 512 by a hinge coupling 528. A latch 524 is coupled to the corner 514 opposite the hinge coupling 528 between the lid 516 and the sidewall 512. The corner 514 is generally planar and transverse to both the sidewall 512 and the adjacent sidewall 512. In the illustrated embodiment, the corner 514 extends generally perpendicularly from the base 508 at a 45 degree angle with respect to each of the sidewalls 512 (the angle being measured from an exterior surface of the sidewall 512 to an exterior surface of the corner 514). However, other angles are possible. The latch 524 is movable between an engaged position in which the latch 524 secures the lid 516 to the corner 514 and a disengaged position in which the lid 516 is movable relative to the sidewall 512.

The container 500 can secure a plurality of items therein. In the illustrated embodiment of FIG. 28, the bin 500 holds a drill 600, an impact driver 604, a battery pack 608, and a battery charger 612 therein. However, other items may be held within the container 500.

FIG. 29 further illustrates the exterior of the container 500. The lid 516 is provided with cleats 144. The latch 524 is provided with a draw arm 526 which is movable relative to the latch 524. FIG. 29 illustrates the latch 524 and the draw arm 526 in a locked position in which the draw arm 526 pulls against the lid 516 to secure the lid to the corner 514. The draw arm 526 is pivotally coupled to the latch 524 such that, in the engaged position, the draw arm 526 pulls the lid 516 towards the corner 514, and in the disengaged position, the draw arm 526 is removed from the lid 516 to permit hinged pivoting of the lid 516 relative to the sidewalls 512. The container 500 may be provided with a handle 540 between the corners 514 having latches 524.

FIG. 30 illustrates use of the container 500 with an adjacent container 500 (illustrated as container 700). The location of the latches 524 on the corners 514 permits use of at least one of the latches 524 even while the container 500 and the adjacent container 500 are mounted side-by-side upon another container 104, 300, 304. As illustrated in FIG. 30, the sidewall 512 extends along a reference line RL1, and an adjacent sidewall 512 extends along a reference line RL2. The reference lines RL1, RL2 converge at a reference point RP1. The reference lines RL1, RL2 define a hypothetical boundary defining the extent of the sidewalls 512 of the container 500. Similarly, the adjacent container 700 includes the sidewall 512 which extends along a reference line RL3, and an adjacent sidewall 512 which extends along a reference line RL4. The reference lines RL3, RL4 converge at a reference point RP2. The reference lines RL3, RL4 define a hypothetical boundary defining the extent of the sidewalls 512 of the container 700. A gap is located between the reference points RP1, RP2 such that the sidewalls defined by the reference lines RL2, RL4 do not intersect.

The container 500 is illustrated with the latch 524 in a disengaged (i.e., open or at least partially open) position in which the latch 524 is moved (i.e., pivoted) away from the corner 514. When the latch 524 is in the engaged position (i.e., the latch 524 of the container 700), the latch 524 is located entirely within a hypothetical boundary extended between the reference lines RL3, RL4 of the sidewalls 512 of the container 700. Similarly, the draw arm 526 may be removed from its position above the lid 516, and the latch 524 may be positioned entirely within the reference lines RL3, RL4 of the sidewalls 512 of the container 700 with the latch 524 in the disengaged position. However, when the latch 524 is in the disengaged position (i.e., the latch 524 of the container 500) in which the latch 524 is pivoted away from the corner 514, the latch 524 is located partially within the reference lines RL1, RL2 as well as being partially located within a hypothetical boundary extended from the reference lines RL3, RL4 of the container 700. However, while the latch 524 of the container 500 is moved between the engaged position and the disengaged position, the latch 524 of the adjacent container 700, while locked to the lid 516, does not interfere with the latch 524 of the container 500. As such, at least one of the adjacent latches 524 of the adjacent containers 500, 700 may be movable between the engaged and the disengaged positions while the adjacent containers 500, 700 are positioned side-by-side with respect to one another.

Figure 31A:
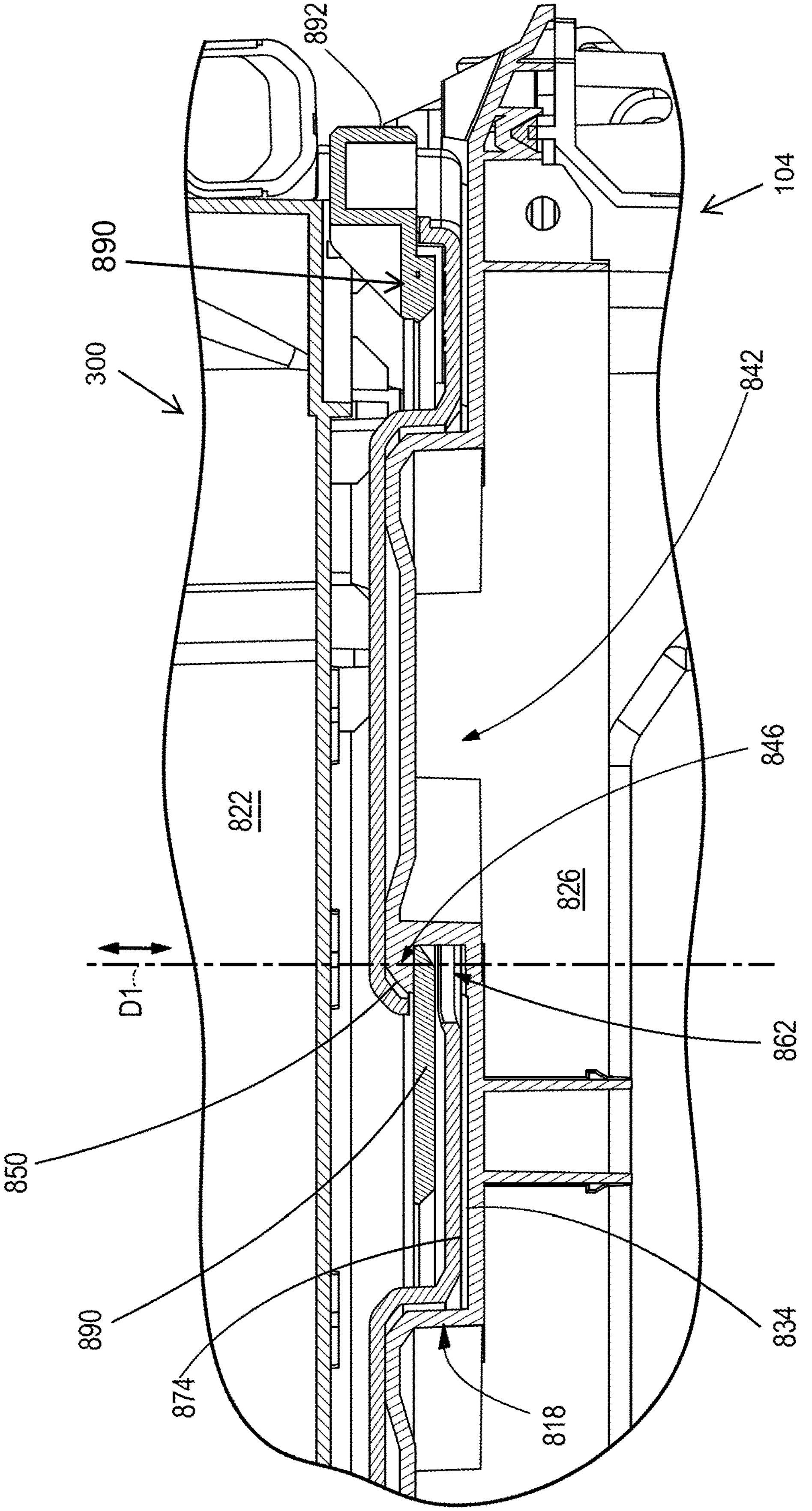
FIG. 31A is a cross-sectional view of the rolling toolbox with a latching mechanism of an upper storage container in an engaged position with a lower storage container.
Figure 31B:
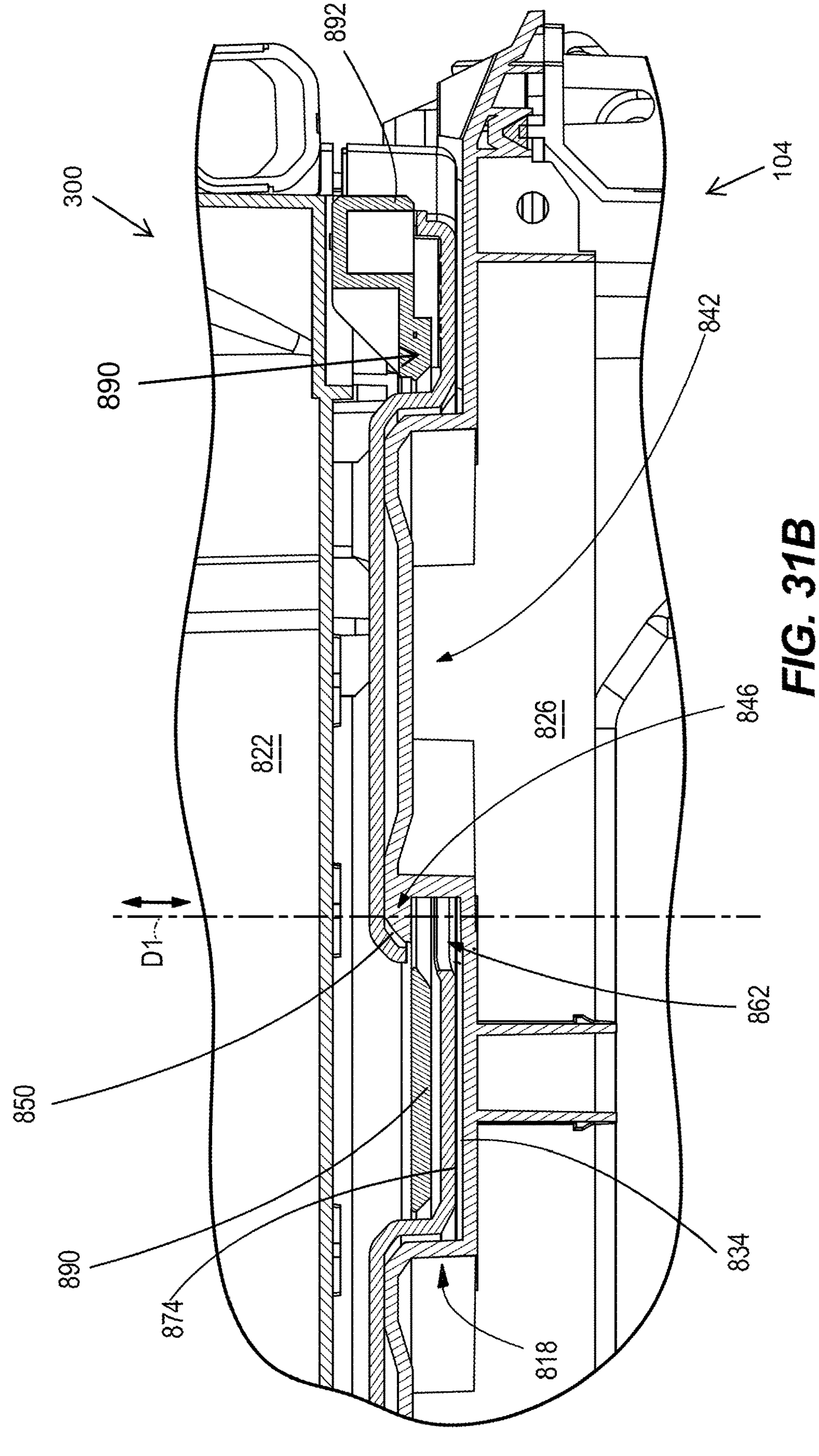
FIG. 31B is a cross-sectional view of the rolling toolbox with the latching mechanism of the upper storage container in a disengaged position with the lower storage container.

Referring now to FIGS. 31A-31B, a mating interface 818 is configured to secure a base 822 of one container (e.g., the container 300) to a lid 826 of an underlying container (e.g., the container 104). The mating interface 818 is movable between an engaged position (i.e., a "first position", FIG. 31A) in which the containers 104, 300 are coupled to each other and a disengaged position (i.e., a "second position," FIG. 31B) in which the containers 104 are movable relative to each other. FIGS. 31A-31B illustrate that the base 822 of the container 300 has a bottom surface 874 that is provided with a ramped surface 850, and the lid 826 includes a cantilevered flange or tab 846. The tab 846 may be provided on the cleat 144 (FIG. 1). The mating interface 818 may include a locking member 890 which is movable. The locking member 890 may take the form of a locking plate 890 as illustrated in FIGS. 31A-31B. In embodiments, the locking member 890 may be biased towards the engaged position. In another other embodiments, the locking member 890 may be otherwise arranged between the containers 104, 300.

During a stacking operation of adjacent containers 104, 300, one container (e.g., the container 300) is placed on top of another container (e.g., the container 104) such that the adjacent containers 104, 300 engage one another at the mating interface 818 and are commonly oriented (FIG. 1). A force exerted along the stacking direction D1 (e.g., by the user, or due to the weight of the upper container 300, and/or both) may cause the ramped surfaces 850 of projections 842 to align the base 822 on the lid 826 with the ramped surface 850 positioned adjacent the tab 846. The force along the stacking direction D1 may also move the locking member 890 against the biasing force toward the second position (FIG. 31B). Once the adjacent containers 104, 300 are brought close enough together for the locking member 890 to move past the tab 846 and inclined surface 850, the locking member 890 is urged to at least partially extend into a gap 862 located between the ramped surface 850 and a surface 834 of the lid 826 (i.e., to a "first position", FIG. 31A). In this position, the locking plate 890 is retained between the tab 846 and the surface 834, and the locking plate 890 inhibits movement of the base 822 relative to the lid 826 in a direction at least partially parallel to the stacking direction D1. Additionally, in this position, the locking plate 890 engages portions of both containers 104, 300 thereby locking the containers 104, 300 together.

During a separating operation of adjacent containers 814, the user actuates a button 892. The button 892 may be integrally formed with the locking plate 890 such that translation of the button 892 (from the first position in FIG. 31A to the second position of FIG. 31B) causes corresponding translation of the locking plate 890. In the illustrated embodiment, the button 892 may be translated in a direction generally perpendicular to the stacking direction D1. Other actuation directions may be possible. In some embodiments, the button 892 is positioned to enable the locking member 890 to be moved by the same hand that grasps the handle 140 (FIG. 1). Once the storage containers 814 are released from one another, the adjacent containers 814 may be separated along the stacking direction D1 (e.g., by lifting an upper container away from a lower container). After the containers 814 have been separated, the locking member 890 may move to the first position by way of the biasing force. Other similar mating interfaces 818 may interconnect the container 104 to the container 300.

Although the disclosure has been described in detail with reference to certain embodiments, variations and modifications exist within the scope and spirit of one or more independent aspects as described. Various features and advantages are set forth in the following claims.

What is claimed is:

1. A rolling toolbox comprising:

a container including a base, a plurality of sidewalls, a lid coupled to one of the sidewalls, and a latch, the lid movable between a closed portion and an open position, the latch selectively securing the lid in the closed position, the lid including a feature configured to engage a complementary feature positioned on the base of another container and releasably secured to the other container in a stacked relationship, the feature comprising a plurality of protrusions, each of the protrusions having a cantilevered flange, at least one of the container and the other container includes a locking plate that is movable between an engaged position in which the locking member secures the base of the other container to the lid and a disengaged position in which the other container is removable from the lid, the locking plate being configured to engage the flange of each of the protrusions and movable relative to a surface of the lid of the container and a bottom surface of the base of the other container;

a wheel rotatably coupled to the container and supporting the container for movement on a support surface; and a handle coupled to the container to guide movement of the container, the handle being movable between a retracted position and an extended position.

2. The toolbox of claim 1, wherein one of the sidewalls includes a surface positioned adjacent the base and oriented at an acute angle relative to the sidewall.

3. The toolbox of claim 1, wherein the cantilevered flange includes a ramped surface configured to provide a cam surface along which the locking plate moves against a biasing force.

4. The toolbox of claim 1, wherein the locking plate is retained between the cantilevered flange and a surface of the lid.

5. The toolbox of claim 1, wherein the locking plate inhibits movement of the base relative to the lid in a direction at least partially parallel to a stacking direction of the containers engaging one another at a mating interface when the locking member engages the flange to each of the protrusions.

6. The toolbox of claim 5, wherein the locking plate engages portions of the containers to lock the containers together when the locking member engages the flange to each of the protrusions.

7. The toolbox of claim 1, the toolbox comprising a button integrally formed with the locking plate.

8. The toolbox of claim 1, the toolbox comprising a mating interface configured to secure the base of the container to the lid of the other container, the mating interface movable between the engaged position and the disengaged position.

9. The toolbox of claim 1, the toolbox comprising a mating interface configured to secure the base of the container to the lid of the other container, the base comprising a ramped surface, and the lid comprising a tab, wherein the mating interface comprises the locking plate.

10. The toolbox of claim 9, wherein the tab is positioned at one of the plurality of protrusions.

11. The toolbox of claim 9, wherein the ramped surface is positioned adjacent to the tab when a force is exerted along a stacking direction of the container and the other container.

12. The toolbox of claim 11, wherein the locking plate is moved toward the disengaged position when the force is exerted along the stacking direction.

13. The toolbox of claim 1, wherein at least one sidewall extends from the base, the sidewall at least partially defining an outer wall of an interior compartment.

14. The toolbox of claim 13, the interior compartment being accessible while the lid is in the open position, the interior compartment being covered while the lid is in the closed position.

15. The toolbox of claim 1, wherein in an engaged position of the locking plate, the locking plate inhibits movement of the other container relative to the container in a stacking direction of the container and the other container.

16. The toolbox of claim 7, wherein translation of the button in a direction perpendicular to a stacking direction of the container and the other container causes corresponding translation of the locking plate.

17. The toolbox of claim 7, wherein the button is positioned to enable the button to be moved by a same hand that grasps the handle.

18. The toolbox of claim 1, wherein each of the plurality of protrusions forms a cleat adapted to function as a hook to secure one or more parts having a complementary cleat interface to the rolling toolbox.

19. The toolbox of claim 1, wherein the plurality of protrusions are evenly spaced on the lid.

* * * * *